(12) United States Patent
Matsumoto

(10) Patent No.: US 8,315,470 B2
(45) Date of Patent: Nov. 20, 2012

(54) IMAGE PROCESSING APPARATUS AND METHOD

(75) Inventor: Yuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1092 days.

(21) Appl. No.: 12/133,884

(22) Filed: Jun. 5, 2008

(65) Prior Publication Data

US 2008/0304762 A1 Dec. 11, 2008

(30) Foreign Application Priority Data

Jun. 6, 2007 (JP) ................................. 2007-150778

(51) Int. Cl.
*G06K 9/36* (2006.01)
(52) U.S. Cl. ..................................................... 382/239
(58) Field of Classification Search ........... 382/232–250
See application file for complete search history.

(56) References Cited

U.S. PATENT DOCUMENTS

| | | | | |
|---|---|---|---|---|
| 5,963,656 A * | 10/1999 | Bolle et al. | ..................... | 382/124 |
| 6,097,364 A | 8/2000 | Miyamoto et al. | ............... | 345/97 |
| 2003/0048954 A1 * | 3/2003 | Matthews | ..................... | 382/240 |
| 2004/0001622 A1 * | 1/2004 | Roylance et al. | ............. | 382/166 |
| 2004/0042680 A1 * | 3/2004 | Saund | ............................ | 382/274 |
| 2004/0056835 A1 * | 3/2004 | Curry et al. | .................... | 345/100 |
| 2005/0036694 A1 * | 2/2005 | Li et al. | .......................... | 382/232 |
| 2005/0249283 A1 | 11/2005 | Kajiwara et al. | .......... | 375/240.12 |
| 2006/0045357 A1 * | 3/2006 | Schwartz et al. | ............. | 382/232 |
| 2006/0045362 A1 | 3/2006 | Ito et al. | ........................ | 382/232 |
| 2006/0171595 A1 * | 8/2006 | Hasegawa et al. | ............ | 382/224 |
| 2006/0210176 A1 | 9/2006 | Kajiwara et al. | ............... | 382/232 |
| 2006/0262982 A1 | 11/2006 | Matsumoto et al. | ........... | 382/238 |
| 2007/0098285 A1 * | 5/2007 | Yahata et al. | ................. | 382/239 |
| 2007/0150803 A1 * | 6/2007 | Ahmed et al. | ................ | 715/513 |
| 2007/0286507 A1 * | 12/2007 | Mori | ............................. | 382/239 |
| 2008/0030812 A1 * | 2/2008 | Mori | ............................. | 358/505 |
| 2008/0056536 A1 * | 3/2008 | Hildreth et al. | ............... | 382/103 |
| 2008/0069457 A1 | 3/2008 | Matsumoto | ................... | 382/232 |

* cited by examiner

*Primary Examiner* — Jingge Wu
(74) *Attorney, Agent, or Firm* — Fitzpatrick, Cella, Harper & Scinto

(57) ABSTRACT

An image, in which a character image and a photographic image are mixed, is efficiently encoded while preventing image quality deterioration. Hence, image data including foreground pixels and background pixels is input. In the image data, first image data is generated by setting a pixel value that does not occur as the foreground pixel to the pixel value of the background pixel based on the histogram of pixel values that occur as foreground pixels, and the first image data is encoded. In the image data, second image data is generated by setting a value based on the pixel value of the background pixel to the pixel value of the foreground pixel, and the second image data is encoded.

21 Claims, 19 Drawing Sheets

FIG. 2
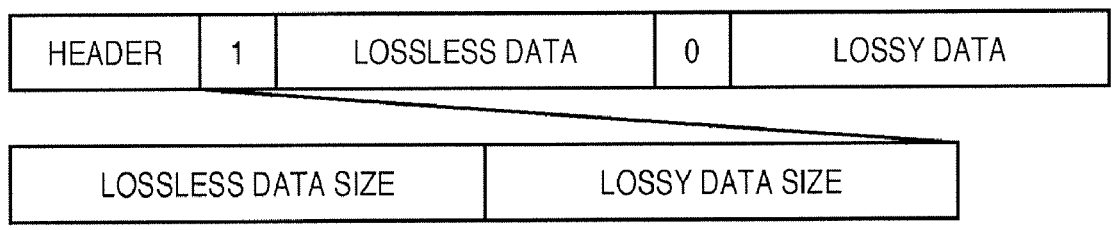
FIG. 3A
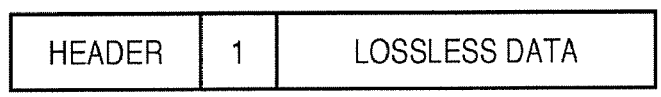
FIG. 3B
FIG. 3C

FIG. 5

| SYMBOL | CODE |
|---|---|
| 255 | 1 1 1 ········ 1 1 1 0 |
| 254 | 1 1 1 ········ 1 1 0 0 |
| ⋮ | ⋮ |
| 3 | 1 1 1 0 0 |
| 2 | 1 1 0 0 |
| 1 | 1 0 0 |
| 0 | 0 0 |
| -1 | 0 1 |
| -2 | 1 0 1 |
| -3 | 1 1 0 1 |
| ⋮ | ⋮ |
| -254 | 1 1 1 ········ 1 1 0 1 |
| -255 | 1 1 1 ········ 1 1 1 1 |

FIG. 14

| LUMINANCE VALUE (i) | F(R,i) | F(G,i) | F(B,i) |
|---|---|---|---|
| 0 | | | |
| 1 | | | |
| 2 | | | |
| 3 | | | |
| ⋮ | | | |
| 254 | | | |
| 255 | | | |

FIG. 16

| VALUE | IDX(R,i) | IDX(G,i) | IDX(B,i) |
|---|---|---|---|
| 0 | 0 | | |
| 1 | | | |
| 2 | 1 | | |
| 3 | 2 | | |
| | | | |

FIG. 18A

| ONE BYTE | CONVERSION TABLE INFORMATION | R ENCODED DATA | G ENCODED DATA | B ENCODED DATA |
|---|---|---|---|---|

| 7 ......... 3 | 2 | 1 | 0 |
|---|---|---|---|
| 0 ......... 0 | 0 : NLV(R) ≥ ML<br>1 : NLV(R) < ML | 0 : NLV(G) ≥ ML<br>1 : NLV(G) < ML | 0 : NLV(B) ≥ ML<br>1 : NLV(B) < ML |

FIG. 18B

| R ENCODED DATA | G ENCODED DATA | B ENCODED DATA |
|---|---|---|
| 0 | | |

F I G. 20
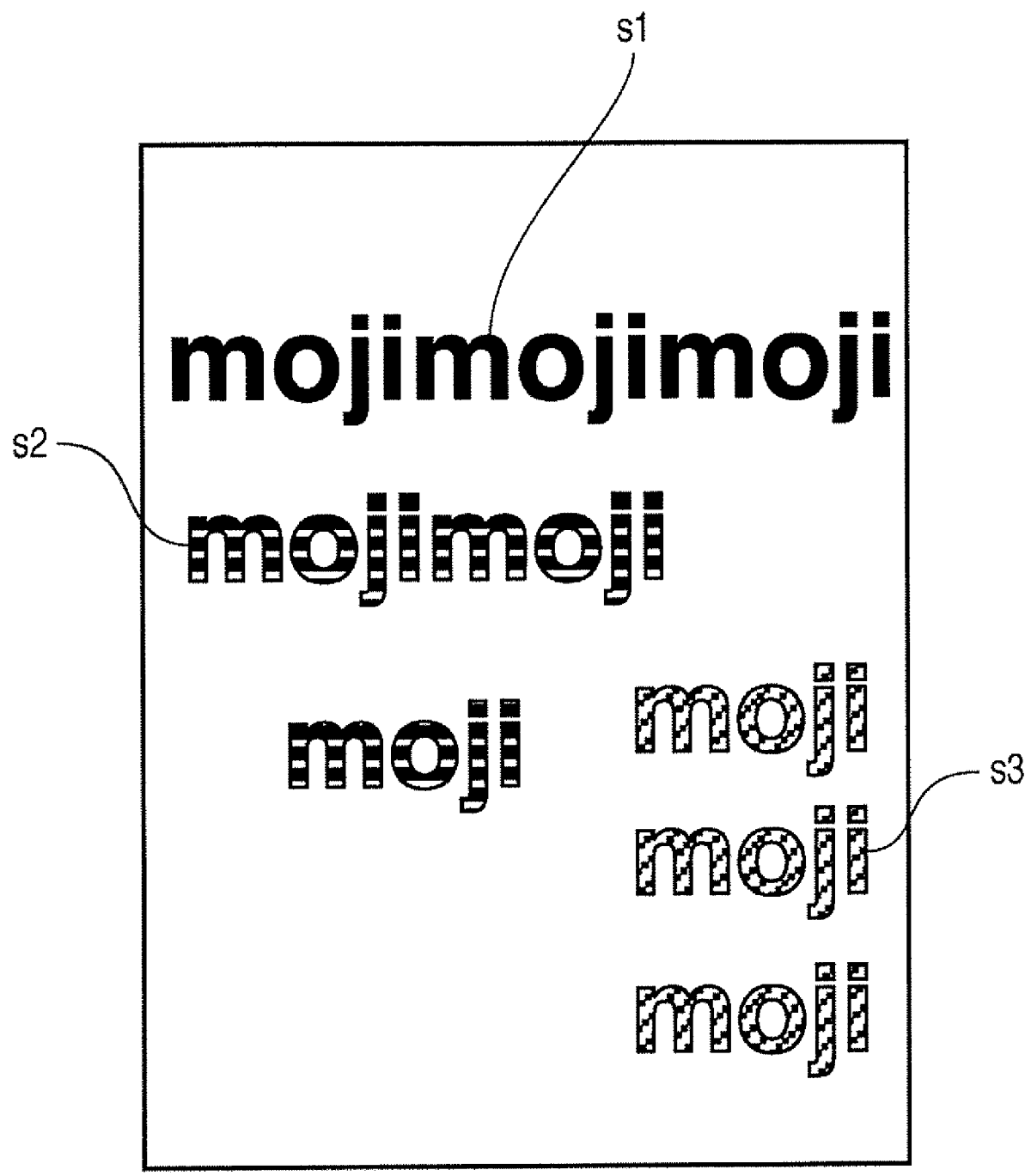

IMAGE PROCESSING APPARATUS AND METHOD

BACKGROUND OF THE INVENTION

1. Field of the Invention

The present invention relates to image processing for encoding image data.

2. Description of the Related Art

There is an image in which a character and line drawing (to be referred to as a character image, hereinafter), and a photographic image are mixed. Such image is to be referred to as a mixed image, hereinafter. If the mixed image is encoded with a high compression rate using one encoding scheme, the image quality deteriorates.

In order to prevent image quality deterioration in encoding of a mixed image, for example, the following method is available. First, image data having a three-layer structure including a character image region (to be referred to as a text region, hereinafter), a photographic image region (to be referred to as a photographic region, hereinafter), and attribute data (binary masking data) for specifying the region is generated. Then, an encoding scheme suited to the characteristics of each region is applied to it.

Since the method which utilizes image data having a three-layer structure requires masking data in addition to image data of a text region and that of a photographic region, the data amount increases.

Another method does not separate image data into three layers to encode it, but extracts a text region using edge information, separates the text region from a region (to be referred to as a background region, hereinafter) other than the character image, and encodes the regions. This method applies lossless encoding to binary data obtained by binarizing a text region, and applies multi-level image encoding to a background region.

The method which separates a text region from a background region and binarizes the text region cannot process a character image with a given tone value or gradation.

SUMMARY OF THE INVENTION

In one aspect, an image processing method comprising the steps of: inputting image data including foreground pixels and background pixels; generating first image data by setting a pixel value that does not occur as the foreground pixel to a pixel value of the background pixel based on a histogram of pixel values that occur as the foreground pixels in the image data; encoding the first image data; generating second image data by setting a value based on the pixel value of the background pixel to the pixel value of the foreground pixel in the image data; and encoding the second image data.

In another aspect, an image processing method comprising the steps of: separating pixels of interest of image data into foreground pixels and background pixels based on a value of the pixel of interest and values of a plurality of pixels surrounding the pixel of interest; generating from the image data a foreground image in which a transparent color is set to a pixel other than the foreground pixel based on a histogram of a pixel value that occurs as the foreground pixel; executing lossless encoding of the foreground image; generating from the image data a background image in which a background pixel value is set to a pixel other than the background pixel; executing lossy encoding of the background image; and synthesizing encoded data obtained in the lossless encoding and encoded data obtained in the lossy encoding, thereby generating encoded data of the image data.

According to these aspects, it is possible to efficiently encode an image in which a character image and a photographic image are mixed while preventing image quality deterioration.

Further features of the present invention will become apparent from the following description of exemplary embodiments with reference to the attached drawings.

BRIEF DESCRIPTION OF THE DRAWINGS

FIG. 2 is a view showing eight surrounding pixels;

FIGS. 3A to 3C are views showing exemplary structures of encode data;

FIG. 5 is a view showing an example of a Huffman table;

FIG. 14 is a view showing binary arrays used by an effective level counter to count the number of effective levels;

FIG. 16 is a view showing an example of an index conversion table;

FIGS. 18A and 18B are views showing exemplary structures of encoded data for each tile;

FIG. 20 is a view showing an example of an image in which foreground pixels having different luminance values mix.

DESCRIPTION OF THE EMBODIMENTS

Image processing of embodiments according to the present invention will now be described in detail with reference to the accompanying drawings.

First Embodiment

Encoding Apparatus

Figure 1:
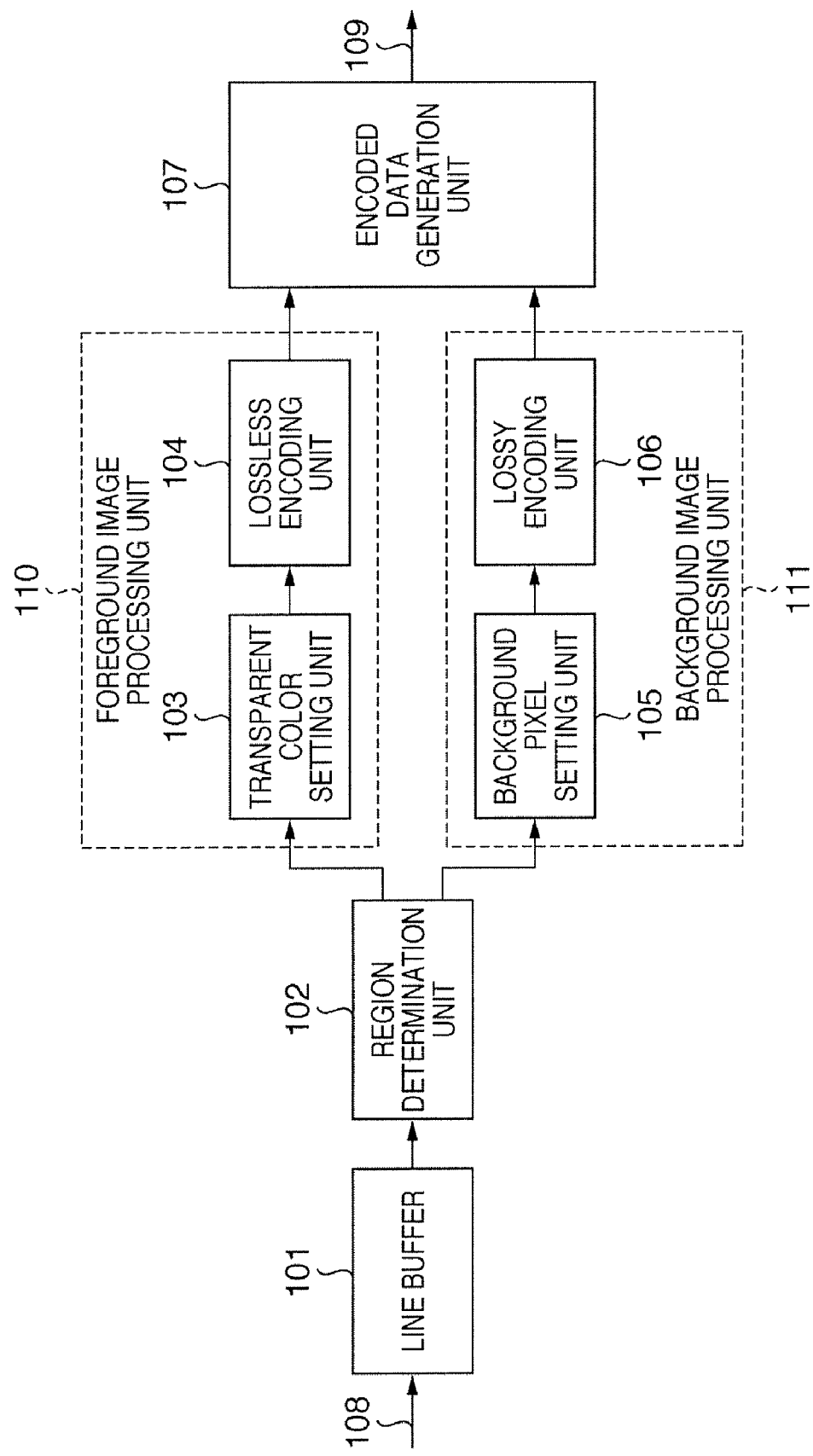
FIG. 1 is a block diagram showing the arrangement of an encoding apparatus of the embodiments of the present invention.

FIG. 1 is a block diagram showing the arrangement of an encoding apparatus of the embodiments.

The input order of pixel data to the encoding apparatus corresponds to the order of the raster scan, and the order that the R, G, and B color component data are input in for the respective pixels. Component numbers 0, 1, and 2 are defined for R, G, and B, respectively, and the coordinates of the upper-left corner of an image are set to (0,0). The value of component number C of a pixel whose position in the horizontal direction is x and that in the vertical direction is y is represented by P(x,y,C). For example, when a pixel at position (3,4) has values (R,G,B)=(255,128,0), it is represented by P(3,4,0)=255, P(3,4,1)=128, and P(3,4,2)=0.

A line buffer 101 inputs image data from a signal line 108 and buffers image data for a plurality of lines. In this embodiment, Th represents the number of lines the line buffer 101 can store. Assuming that one pixel has 3 bytes in which each of R, G, and B is represented by 8-bit data and the number of pixels in one line is W, the line buffer has a storage capacity of 3×W×Th bytes. Note that the line buffer 101 buffers a band-like image for Th lines of an original image. This band-like image is referred to as a stripe or stripe image. For convenience of explanation, a pixel count H in the vertical direction of an original image is assumed to be an integral multiple of Th so that no incomplete stripe is generated at the end of the image.

[Region Determination Unit]

A region determination unit 102 performs determination (to be referred to as foreground/background determination, hereinafter) as to whether a pixel of interest is included in a foreground or background, for image data for a plurality of lines buffered in the line buffer 101. For each component of a pixel of interest, the region determination unit 102 reads out the following component values of values a to h of eight pixels (to be referred to as eight surrounding pixels, hereinafter) surrounding the pixel of interest illustrated in FIG. 2.

a={P(x−1,y−1,0), P(x−1,y−1,1), P(x−1,y−1,2)}
b={P(x,y−1,0), P(x,y−1,1), P(x,y−1,2)}
c={P(x+1,y−1,0), P(x+1,y−1,1), P(x+1,y−1,2)}
d={P(x−1,y,0), P(x−1,y,1), P(x−1,y,2)}
e={P(x+1,y,0), P(x+1,y,1), P(x+1,y,2)}
f={P(x−1,y+1,0), P(x−1,y+1,1), P(x−1,y+1,2)}
g={P(x,y+1,0), P(x,y+1,1), P(x,y+1,2)}
h={P(x+1,y+1,0), P(x+1,y+1,1), P(x+1,y+1,2)} where P(x,y,C) is the component value of the pixel of interest.

When any of eight surrounding pixels falls outside the image since the pixel of interest is in the first or last line of the image or at the leading/trailing end of each line, a common component value, for example, 0, is used on the encoding side and decoding side for a surrounding pixel outside the image.

The region determination unit 102 compares the component value P(x,y,C) of the pixel of interest with each component value of the eight surrounding pixels. The region determination unit 102 outputs information which indicates the presence/absence of a neighborhood pixel having the same pixel value as the pixel of interest to a transparent color setting unit 103 of a foreground image processing unit 110 and a background pixel setting unit 105 of a background image processing unit 111. Note that when pixel values are said to be the same, all the component values must be the same. That is, for two pixel values (r1,g1,b1) and (r2,g2,b2), r1=r2, g1=g2, and b1=b2.

When at least one of the eight pixels surrounding the pixel of interest has a value which coincides with a value X of the pixel of interest, the region determination unit 102 determines that the pixel of interest is a foreground pixel and outputs it to the transparent color setting unit 103. In addition, the region determination unit 102 outputs determination information (e.g., "1") indicating that the pixel of interest is a foreground pixel to the transparent color setting unit 103 and background pixel setting unit 105.

On the other hand, when none of the eight pixels surrounding the pixel of interest have a value which coincides with the value X of the pixel of interest, the region determination unit 102 determines that the pixel of interest is a background pixel and outputs it to the background pixel setting unit 105. In addition, the region determination unit 102 outputs determination information (e.g., "0") indicating that the pixel of interest is a background pixel to the transparent color setting unit 103 and background pixel setting unit 105. That is, the region determination unit 102 groups pixels of interest into foreground pixels and background pixels.

[Foreground Image Processing Unit]

The transparent color setting unit 103 of the foreground image processing unit 110 performs a foreground image generation process based on the pixel of interest and determination information input from the region determination unit 102. When the determination information is "1", that is, when the pixel of interest is a foreground pixel, the transparent color setting unit 103 outputs the value X of the pixel of interest to a lossless encoding unit 104 without any change. When the determination information is "0", that is, when the pixel of interest is a background pixel, the transparent color setting unit 103 outputs a given pixel value t to the lossless encoding unit 104. A pixel value output by the transparent color setting unit 103 is represented by Xf.

The pixel value t which is used to replace the value X of the pixel of interest by the transparent color setting unit 103 is referred to as a "transparent color" hereinafter. Note that, a pixel value that does not occur as a foreground pixel is set as a transparent color. This pixel value (transparent color) is set based on the histogram of the pixel values that occur as foreground pixels.

(Setting of Transparent Color t)

A practical example of the method of setting the transparent color t will be described below.

First, the frequency of occurrence of the luminance values (pixel values) is checked for each of the R, G, and B components of the pixels (foreground pixels) extracted as a foreground image, to generate a histogram.

Based on this histogram (distribution state of pixel values), a pixel value optimum to improve the efficiency of lossless encoding to be executed in a later stage is set as the transparent color. For example, the following methods are applicable as the method of determining the optimal pixel value. Note that the numerical values described below are merely examples used to simplify the relationship between the respective conditions, and the present invention is not limited to them.

(I) A Case in which Foreground Pixels Include Similar Colors (Pixel Values)

Figure 19A:
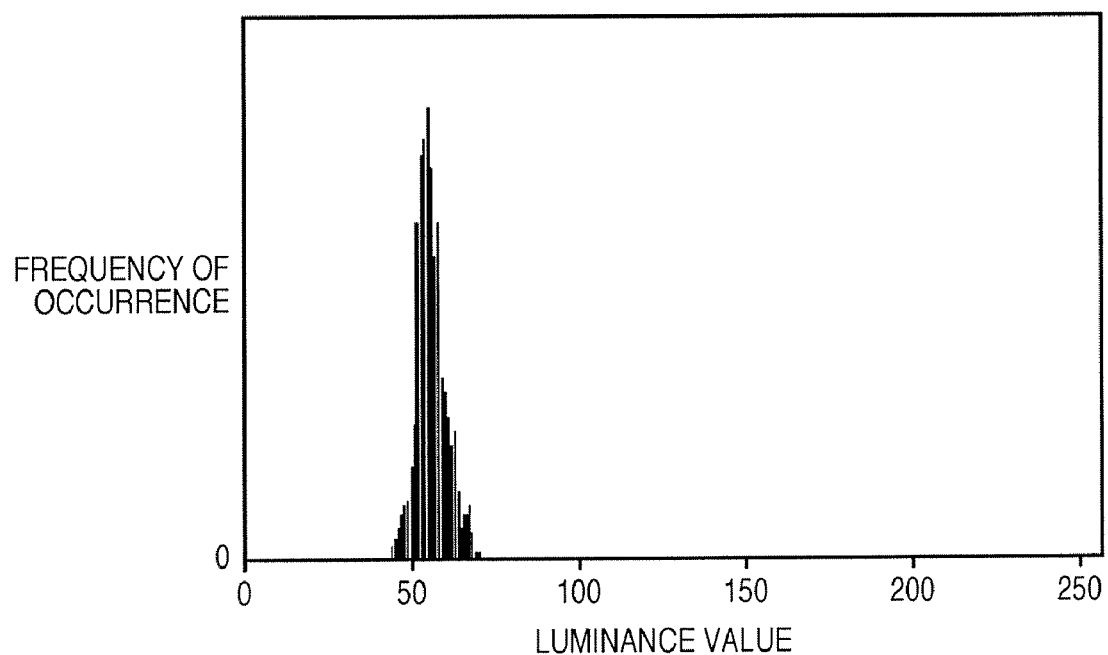
FIGS. 19A to 19D are graphs showing exemplary histograms of foreground pixels.

FIG. 19A is a graph showing a representative histogram of a case in which the distribution of luminance values (pixel values) present in a foreground image satisfies the following conditions, and illustrates a foreground image having the following characteristics:

(1) the number of luminance values counted one or more times is 27;

(2) the number of boundaries (a boundary between a region (to be referred to as a gathering range, hereinafter) in which luminance values counted one or more times gather and another gathering range) is 0; and (3) the width of the gathering range (when there are a plurality of gathering ranges, the width of the gathering range which includes a largest number of luminance values counted one or more times) is 27.

For example, when each histogram of R, G, and B shows the characteristics as illustrated in FIG. 19A, it can be considered that the foreground pixels include similar colors (pixel values). That is, the histogram of FIG. 19A shows a distribution in which the luminance values (pixel values) that occur densely gather in one portion. In this case, a preceding value (smaller value) adjacent to the minimum value of the luminance values (pixel values) that occur or a succeeding value (larger value) adjacent to the maximum value is set as the transparent color t. In the example shown in FIG. 19A, since the minimum luminance value is 43 and the maximum luminance value is 69, a luminance value of 42 or 70 is set as the transparent color t.

(II) A Case in which the Luminance Values (Pixel Values) of Foreground Pixels Gather to Some Extent But are Still "Sparse"

Figure 19B:
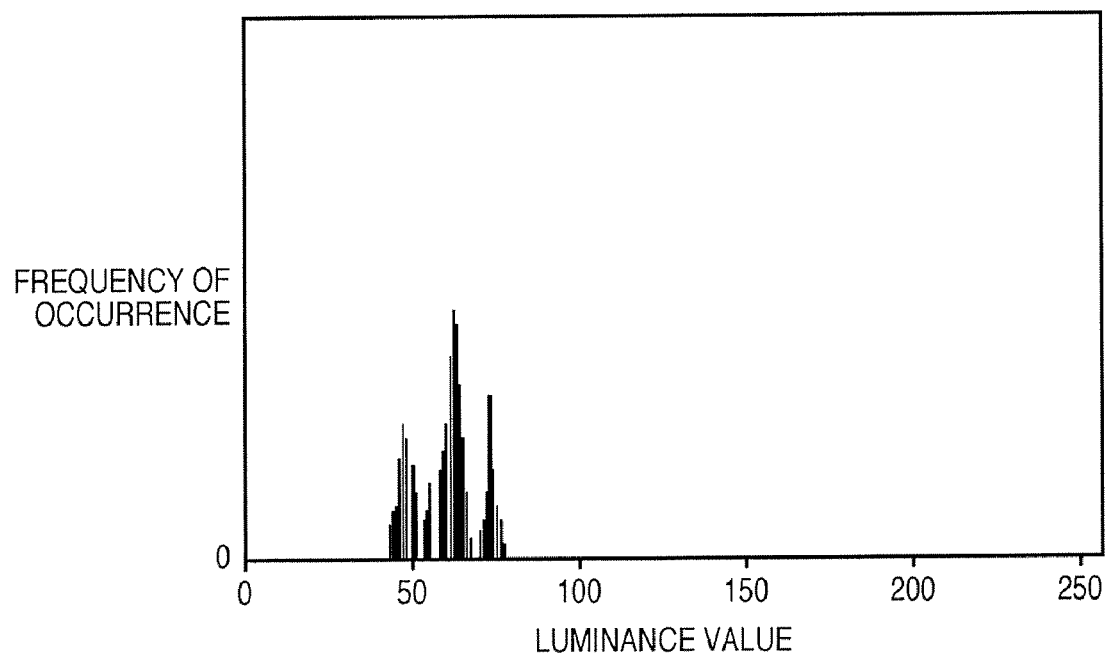

FIG. 19B is a graph showing a representative histogram of a case in which the distribution of luminance values (pixel values) present in a foreground image satisfies the following conditions, and illustrates a foreground image having the following characteristics:

(4) the number of luminance values counted one or more times is 2 to 10;

(5) the number of boundaries is 4; and (6) the width of the gathering range (when there are a plurality of gathering ranges, the width of the gathering range which includes a largest number of luminance values counted one or more times) is 10.

For example, when each histogram of R, G, and B shows the characteristics as illustrated in FIG. 19B, it can be considered that the distribution of the luminance values (pixel values) that occur as foreground pixels is localized (gathered) to some extent but sill sparse. In this case, the center (median) of the range of the luminance values that occur is checked, and a value closest to the median is set as the transparent color t. In the example shown in FIG. 19B, the minimum luminance value that occurs is 44 and the maximum luminance value is 78. Accordingly, the median is 60. Since a luminance value that has not occurred and closest to 60 is 58, the transparent color t=58 is set.

Figure 19C:
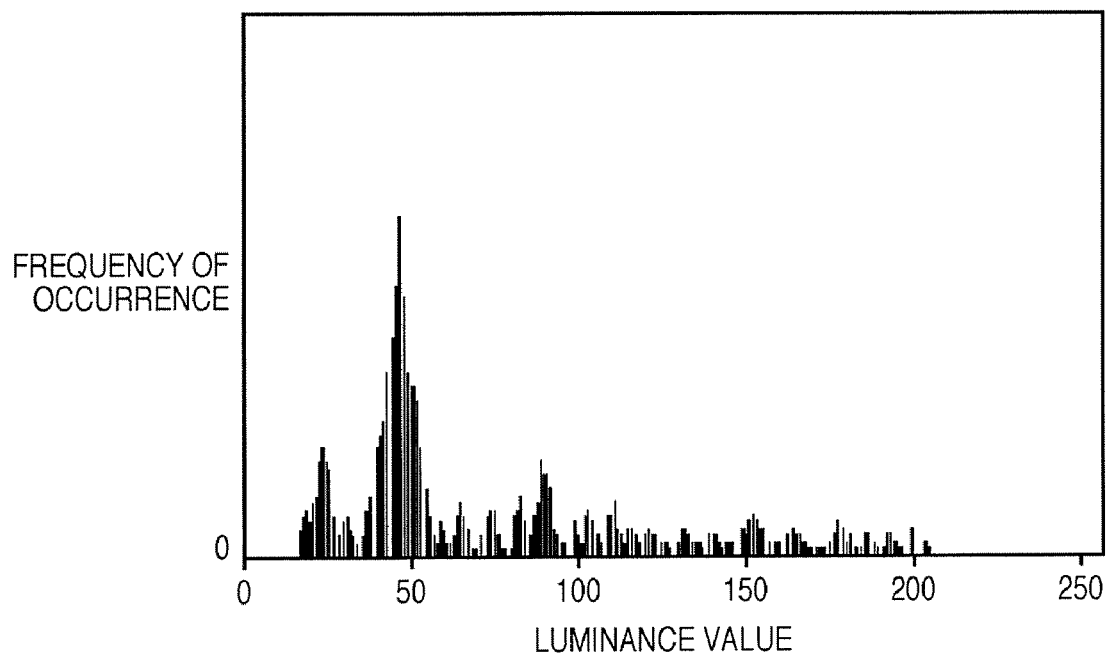

(III) A Case in which the Luminance Values (Pixel Values) of Foreground Pixels are Dispersed FIG. 19C is a graph showing a representative histogram of a case in which the distribution of luminance values (pixel values) present in a foreground image satisfies the following conditions, and illustrates a foreground image having the following characteristics:

(7) the number of luminance values counted one or more times is 1 to 13;

(8) the number of boundaries is 33; and (9) the width of the gathering range (when there are a plurality of gathering ranges, the width of the gathering range which includes a largest number of luminance values counted one or more times) is 13.

For example, when each histogram of R, G, and B shows the characteristics as illustrated in FIG. 19C, it can be considered that the distribution of the luminance values (pixel values) that occur as foreground pixels is not dense (is dispersed). In this case, a luminance value having a highest frequency of occurrence is checked, and a value closest to that luminance value is set as the transparent color t. In the example shown in FIG. 19C, a luminance value having a highest frequency of occurrence is 16. Accordingly, a luminance value of 21 that has not occurred and closest to 16 is set as the transparent color t.

When any one of the above-described setting methods (I), (II), and (III) is adopted, the color (pixel value) of a pixel (background pixel) to which the transparent color t is set becomes close to that of another, adjacent pixel (foreground pixel). Therefore, it is possible to decrease a value of a prediction error calculated in the predictive encoding to be small. Upon variable-length encoding of this prediction error, since a short code word is assigned to the prediction error, the coding efficiency of lossless encoding is improved.

(Setting of a Plurality of Transparent Colors t)

FIG. 20 is a view showing an example of an image in which foreground pixels having different luminance values mix.

In case of the image as shown in FIG. 20, it is considered to be preferable to use the transparent colors t of more than one kind in order to further improve the efficiency of lossless encoding. When there are two or more pixel values that do not occur as foreground pixels, it is also effective to utilize these two or more pixel values as values corresponding to the transparent colors t. That is, when two or more kinds of colors (pixel values) are utilized as the transparent colors (t1, t2, . . . , tn), the encoding efficiency can be improved.

A practical example of a method of setting a plurality of transparent colors t is described below.

As in the case in which a transparent color t of one kind is used, the frequency of occurrence of luminance values (pixel values) is checked for each of the R, G, and B components of the pixels (foreground pixels) extracted as a foreground image, to generate a histogram.

Based on this histogram (distribution state of pixel values), a plurality of pixel values optimum to improve the efficiency of lossless encoding to be executed in a later stage are set as the transparent colors (t1, t2, . . . , tn). For example, the following methods are applicable as the method of determining the optimal pixel values. Note that the numerical values described below are merely examples used to simplify the relationship between the respective conditions, and the present invention is not limited to them.

(IV) A Case in which Foreground Pixels Include Several Colors (Pixel Values)

Figure 19D:
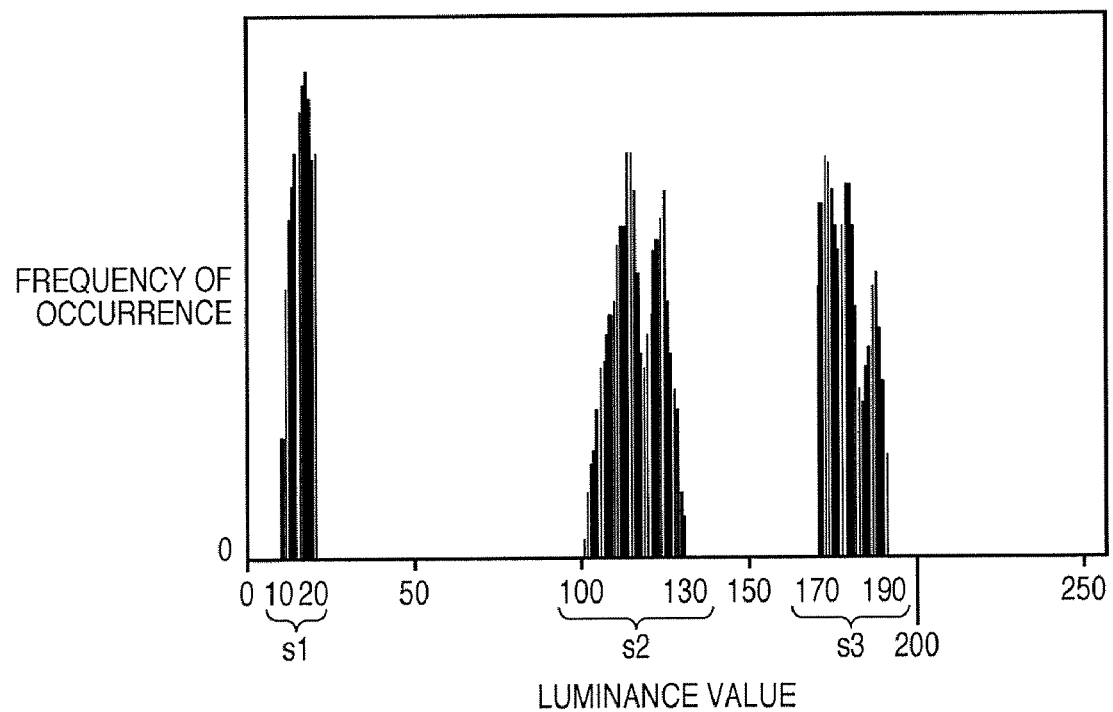

FIG. 19D is a graph showing a representative histogram of a case in which the distribution of luminance values (pixel values) present in a foreground image satisfies the following conditions:

(10) the number of luminance values counted one or more times is 11 to 31;

(11) the number of boundaries is 2; and

(12) the widths of the gathering ranges (when there are a plurality of gathering ranges, the width of the gathering range which includes a largest number of luminance values counted one or more times) are 11, 21, and 31.

For example, when each histogram of R, G, and B shows the characteristics as illustrated in FIG. 19D, it can be considered that the luminance values (pixel values) that occur as foreground pixels are localized (gather) in several ranges (gathering ranges). For example, when the luminance values are localized in a range s1 of 10 to 20, a range s2 of 105 to 130, and a range s3 of 170 to 190, it is preferable to set transparent colors t1, t2 and t3 appropriate for the respective ranges (gathering ranges). At this point, any one of the above-described methods (I), (II), and (III) can be adopted as a method of setting the transparent color for each range (each gathering range).

(Replacement)

The positions of pixels in an image to be replaced by, for example, three transparent colors t1, t2, and t3 will be described next.

First, a histogram is generated for each line of a foreground image. As the result of generation of the histogram, when no luminance value exists in the line of interest, any one of the transparent colors t1, t2, and t3 is set as a default value. t1 is set as a default value in this embodiment.

When a luminance value exists in the line of interest, a transparent color is set depending upon the range s1, s2, or s3 of the histogram that includes the luminance value. For example, when a luminance value is present only in the range s1, the transparent color t1 is set for a pixel other than pixel (foreground pixel) extracted as the foreground of the line of interest.

When luminance values are present in a plurality of gathering ranges in the line of interest, a luminance value in one of the gathering ranges is set as a transparent color. For example, a transparent color may be set depending on the gathering range including a luminance value that occurs earlier in the order of raster scan. Alternatively, a transparent color close to the luminance value having a high frequency of occurrence may be set, based on the distribution of the histogram in the line of interest.

A transparent color need not always be set for each line. A foreground image may be divided into blocks of n×m pixels and a histogram of luminance values in each block may be generated, and a transparent color may be set for each block according to the same method as described above. The transparent color t set according the above-described method is added to encoded data as header information so that the value corresponding to the transparent color t can be determined upon decoding. A value which is not used as the value of the foreground pixel is checked and set as the transparent color t. A pixel value which is unlikely to exist may be set as the transparent color t in advance. In other words, any value can be used as the transparent color t as long as it is not used as the value of a foreground pixel.

[Background Image Processing Unit]

The background pixel setting unit 105 of the background image processing unit 111 performs background image generation processing based on the pixel of interest and determination information input from the region determination unit 102. When the determination information is "0", that is, when the pixel of interest is a background pixel, the background pixel setting unit 105 outputs the value X of the pixel of interest to a lossy encoding unit 106 without any change. When the determination information is "1", that is, when the pixel of interest is a foreground pixel, the background pixel setting unit 105 assigns a given background pixel value as the value X of the pixel of interest, and outputs the assigned value to the lossy encoding unit 106. A pixel value output by the background pixel setting unit 105 is represented by Xb.

As a background pixel value to be assigned by the background pixel setting unit 105 to a pixel of interest determined as a foreground pixel, for example, the value of a background pixel preceding the pixel of interest can be set. Alternatively, a predetermined value may be set. Also, the average value of the value of a background pixel above the pixel of interest and that of a background pixel on the left of the pixel of interest may be set. That is, any value that produces good encoding efficiency when encoding the background image can be set as a background pixel value.

[Encoded Data Generation Unit]

An encoded data generation unit 107 combines encoded data (to be referred to as lossless data, hereinafter) input from the lossless encoding unit 104 and encoded data (to be referred to as lossy data, hereinafter) input from the lossy encoding unit 106 into one encoded data in one of the forms shown as examples in FIGS. 3A to 3C. The obtained encoded data is output to a signal line 109.

As shown in FIG. 3A, the leading portion of encoded data has additional information indicating the data length (size) of lossless data and that of lossy data as a header. The lossless data exists after one bit indicating a foreground image which underwent lossless encoding. One bit indicating a background image which underwent lossy encoding and lossy data continues after that. For example, a bit which indicates the encoded data of a foreground image is set to "1", and a bit which indicates the encoded data of a background image is set to "0".

Of course, when all the pixels of an original image are determined to be foreground pixels, encoded data which includes a header indicating the lossless data size, a bit "1" indicating the encoded data of a foreground image, and lossless data is generated, as shown in FIG. 3B. Likewise, when all the pixels of an original image are determined as background pixels, encoded data which includes a header indicating the lossy data size, a bit "0" indicating the encoded data of a background image, and lossy data is generated, as shown in FIG. 3C.

[Lossless Encoding Unit]

The lossless encoding unit 104 buffers image data input from the transparent color setting unit 103 and executes lossless encoding of the image data. The lossless encoding unit 104 can be any encoder as long as it executes lossless encoding. For example, JPEG-LS (ISO/IEC14495-1 and 2), which is recommended as an international standard for effective lossless or near lossless compression of static images having continuous tone, or the like can be utilized.

Figure 4:
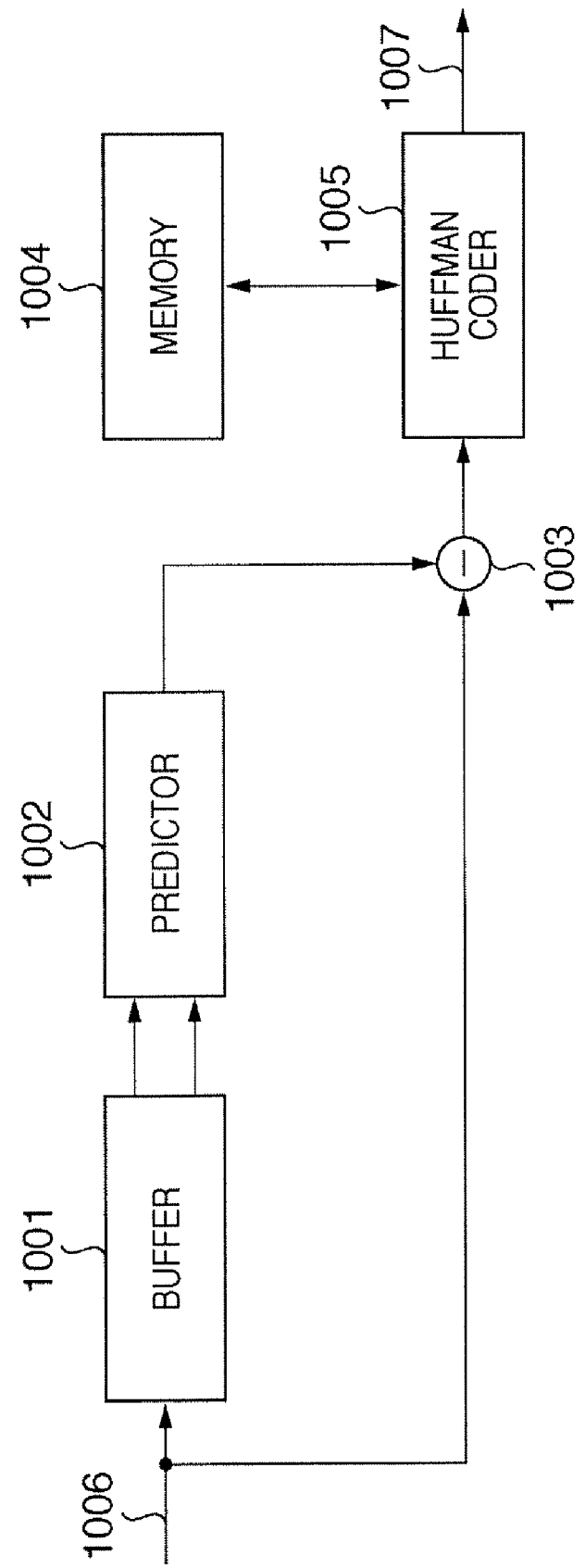
FIG. 4 is a block diagram showing the arrangement of a lossless encoding unit.

FIG. 4 is a block diagram showing the arrangement of the lossless encoding unit 104, and illustrates an example of an image compression scheme which uses predictive conversion using surrounding pixels to convert image data into a prediction error and uses Huffman encoding for an encoding process.

Before the lossless encoding unit 104 actually executes encoding, the frequency distribution of prediction errors obtained by converting image data representing several images is checked in advance to generate a Huffman table as shown in FIG. 5, and the generated table is stored in a memory 1004. As a general nature of the frequency distribution of prediction errors, the frequency of occurrence tends to be high at the prediction error of 0 as a center and decrease as the absolute value of the prediction error increases. Therefore, based on the Huffman table stored in the memory 1004, a short code word is assigned to data having a prediction error in the neighborhood of 0, and a long code word is assigned to data having a prediction error with a large absolute value.

A buffer 1001 inputs image data from the transparent color setting unit 103 (a signal line 1006). When image data for one line has been stored in the buffer 1001, a predictor 1002 extracts a pixel value d of an immediately preceding pixel of a pixel to be encoded and a pixel value b of a pixel one line before the current line, and generates a predicted value p by calculating, for example, $p=(d+b)/2$.

A subtracter 1003 calculates a difference value e between the pixel value Xf of the pixel to be encoded and the predicted value p by $e=Xf-p$ and outputs it. A Huffman coder 1005 looks up the Huffman table stored in the memory 1004 and outputs a code corresponding to the difference value e (symbol) to the encoded data generation unit 107 (a signal line 1007).

[Lossy Encoding Unit]

The lossy encoding unit 106 buffers image data input from the background pixel setting unit 105 and executes lossless encoding of the image data. The lossy encoding unit 106 can adopt any encoder which observes or complies with JPEG (ITU-T recommendation T.81|ISO/IEC10918-1) recommended as an international standard for multi-level photographic images.

That is, when there is a neighborhood pixel having the same pixel value as a pixel of interest, the pixel of interest is likely to form a text region. By utilizing this nature, a pixel forming a text region is extracted and separated as a foreground pixel and undergoes lossless encoding. According to this method, a white background and a background having a single color are also extracted and separated as a foreground image. However, since lossless encoding of an image in which a single color continues is high in compression efficiency and no block noise occurs, quality deterioration of the background image can be prevented.

If a pixel of interest is extracted as a foreground pixel when the value of the pixel of interest coincides with that of a neighborhood pixel, a given pixel of interest may not be separated as a foreground pixel due to a small difference in color. To solve this problem, a difference diff between the value of a pixel of interest and that of a neighborhood pixel is calculated using the following equation. When the difference diff is smaller than, for example, an empirically obtained threshold range, the value of the pixel of interest is considered to be similar to that of the neighborhood pixel, and the pixel of interest can be separated as a foreground pixel.

$diff=\sqrt{\{(Ri-Rn)^2+(Gi-Gn)^2+(Bi-Bn)^2\}}$ where each of $Ri$, $Gi$, and $Bi$ is the color component value of the pixel of interest; and each of $Rn$, $Gn$, and $Bn$ is the color component value of the neighborhood pixel.

Decoding Apparatus

Figure 6:
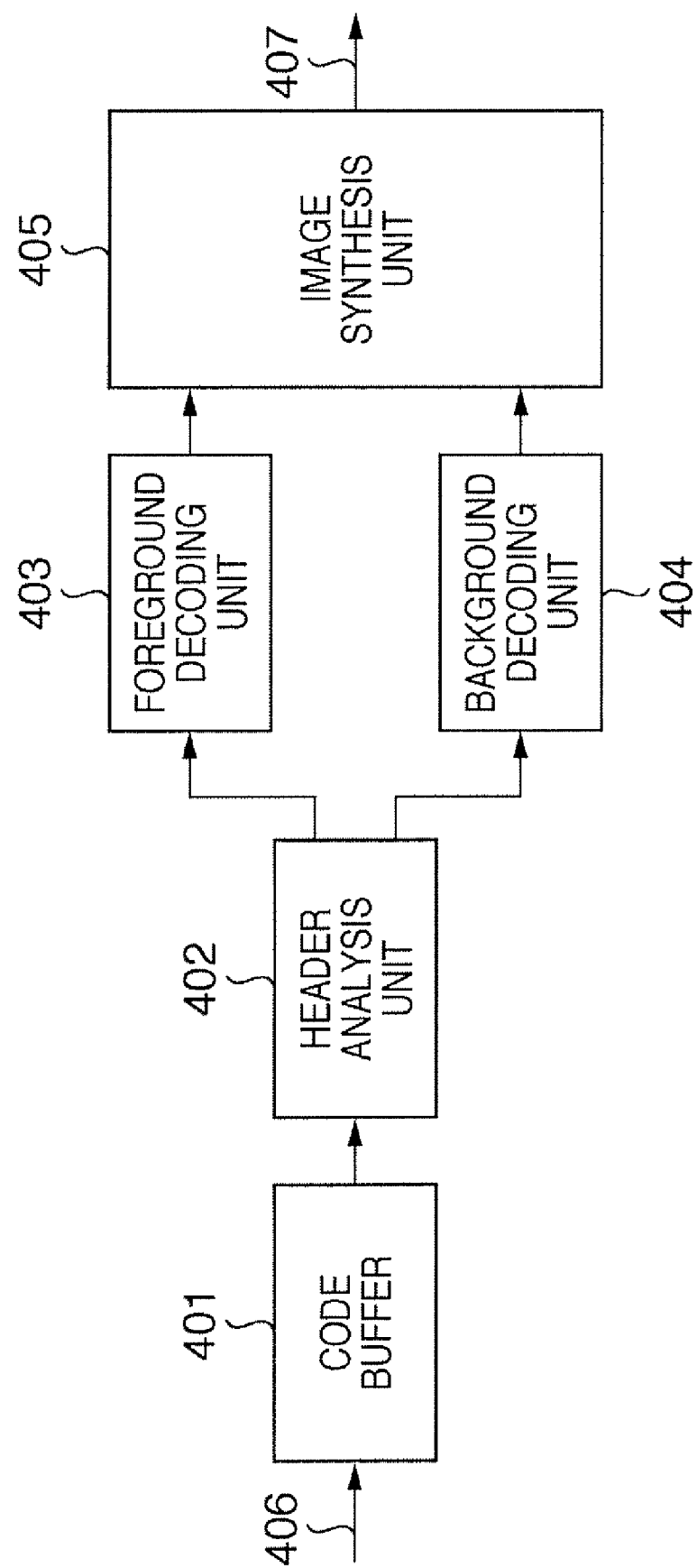
FIG. 6 is a block diagram showing the arrangement of a decoding apparatus of the embodiments of the present invention.

A decoding apparatus for decoding encoded data generated by the above-described encoding apparatus will now be described. FIG. 6 is a block diagram showing the arrangement of a decoding apparatus of the embodiments.

A code buffer 401 inputs encoded data to be decoded through a signal line 406. A header analysis unit 402 reads in the encoded data stored in the code buffer 401, analyzes header information added to the encoded data, and extracts information required to decode image data.

The header analysis unit 402 extracts data for the data size described in the header information from the encoded data after the header. Of course, when a plurality of data sizes are described in the header information, encoded data corresponding to the respective data sizes are extracted. When the start bit of the extracted encoded data is "1", the header analysis unit 402 outputs this encoded data to a foreground decoding unit 403. When the start bit is "0", the header analysis unit 402 outputs this encoded data to a background decoding unit 404.

The foreground decoding unit 403 decodes lossless data input from the header analysis unit 402 and outputs the decoded image data to an image synthesis unit 405. Likewise, the background decoding unit 404 decodes lossy data input from the header analysis unit 402 and outputs the decoded image data to the image synthesis unit 405.

The image synthesis unit 405 synthesizes image data (to be referred to as foreground data, hereinafter) input form the foreground decoding unit 403 with image data (to be referred to as background data, hereinafter) input from the background decoding unit 404, and outputs the image data of the synthesis result, that is, the decoded image data, to a signal line 407.

Figure 7:
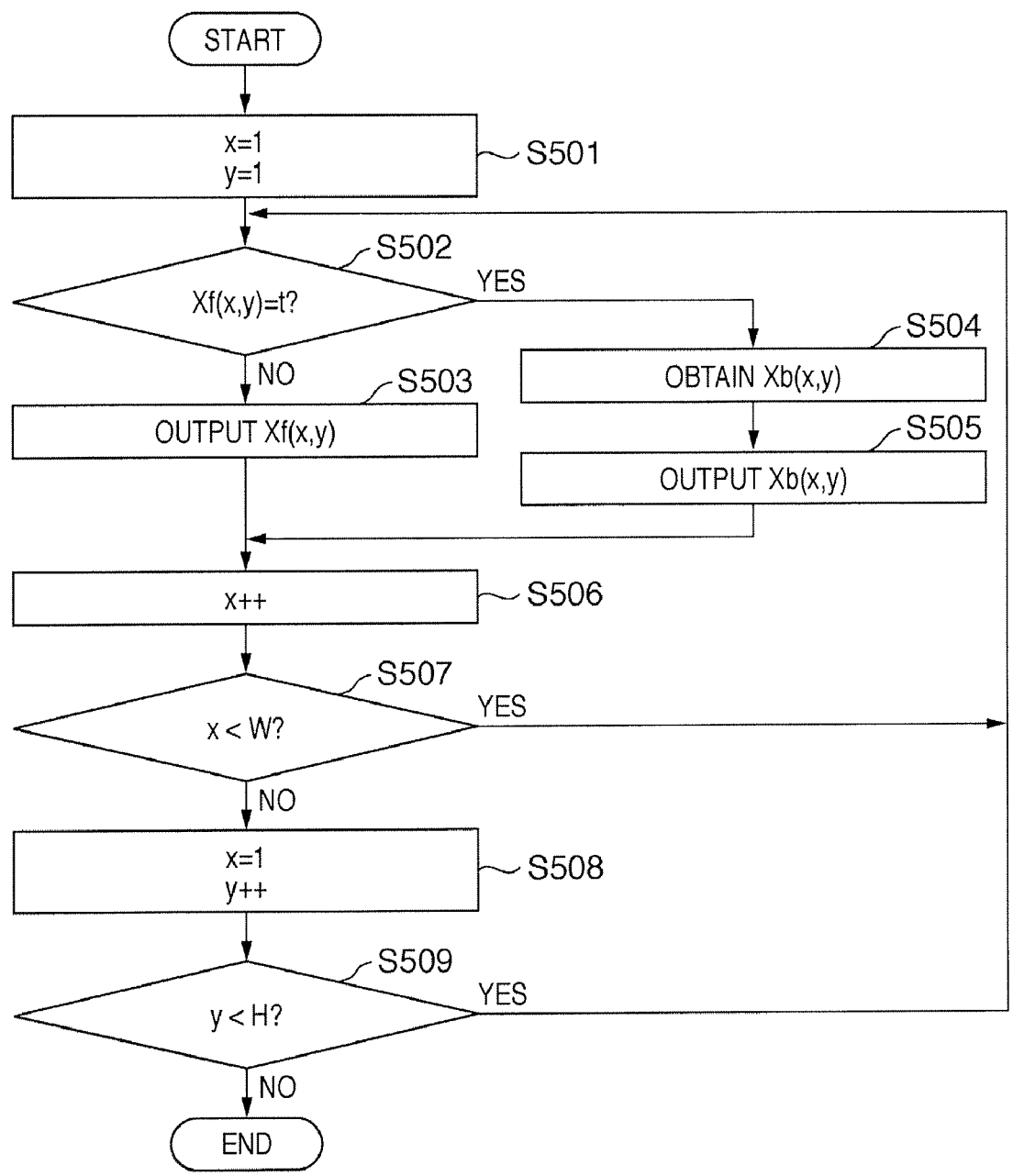
FIG. 7 is a flowchart illustrating the process of an image synthesis unit.

FIG. 7 is a flowchart illustrating the process of the image synthesis unit 405.

When decoding is started, the image synthesis unit 405 initializes a counter y for counting the position of a pixel of interest in the vertical direction and a counter x for counting the position in the horizontal direction to 1 (S501).

The image synthesis unit 405 compares the value $Xf(x,y)$ of a pixel of interest of the foreground data with the transparent color t (S502). When $Xf(x,y) \neq t$, the value $Xf(x,y)$ of the pixel of interest is output without any change (S503). When $Xf(x,y)=t$, the image synthesis unit 405 reads out the value $Xb(x,y)$ of a pixel of interest of the background data (S504) and outputs it (S505). The transparent color t is provided from the header analysis unit 402 based on the analysis result of the header information.

The image synthesis unit 405 increments the counter x (S506) and compares the counter x with the pixel count W in the horizontal direction (S507). When x<W, the process returns to step S502 and the next pixel is selected as a pixel of interest. The pixel count W is provided from the header analysis unit 402 based on the analysis result of the header information.

When x=W, the image synthesis unit 405 sets the counter x to 1, increments the counter y (S508), and compares the counter y with the pixel count H in the vertical direction (S509). When y<H, the process returns to step S502 and the next line is selected as a line of interest. The pixel count H is provided from the header analysis unit 402 based on the analysis result of the header information.

When y=H, the image synthesis unit 405 terminates the process.

In this manner, the value of a pixel of interest of an original image is compares with the values of the eight surrounding pixels. Foreground/background determination is performed based on whether there is any neighborhood pixel having the same (or similar) pixel value as the pixel of interest. Based on the determination result, the pixel of interest is classified as a foreground pixel or a background pixel. A foreground image including foreground pixels which show high connectivity to each other undergoes lossless encoding. A background image including background pixels which show low connectivity to each other undergoes lossy encoding. In addition, lossless encoding is executed by replacing the pixel value of the foreground image corresponding to the position of the background pixel by the transparent color t.

Accordingly, with replacement using the transparent color t, it is possible to efficiently compress and encode an original image in which a text region and a photographic region mix without requiring masking data. In addition, since a text region with a tone or gradation can be extracted as a foreground image, it is possible to compress and encode an original image while keeping the tone or gradation of a character image unchanged.

[Arrangement of Apparatus]

Figure 8:
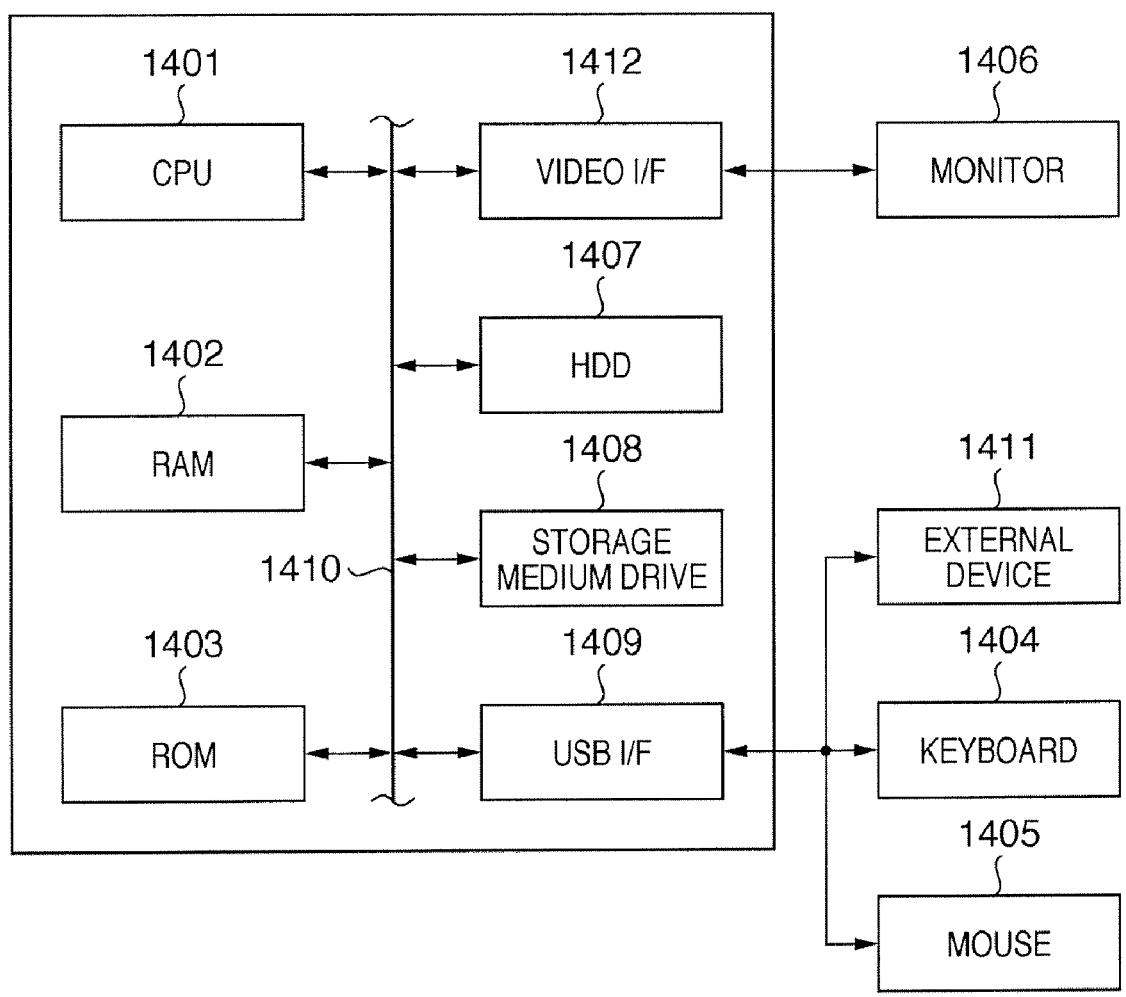
FIG. 8 is a block diagram showing the arrangement of a computer apparatus.

The above-described encoding apparatus and decoding apparatus can be implemented by causing a computer apparatus to execute an encoding program and decoding program. FIG. 8 is a block diagram showing the arrangement of a computer apparatus.

A CPU 1401 uses a RAM 1402 as a work memory, and controls the respective components through a system bus 1410 in accordance with an operating system (OS) or program stored in an ROM 1403 or a hard disk drive (HDD) 1407. The HDD 1407 stores programs including the encoding program and decoding program according to the embodiment so that the above-described encoding and decoding of image data are possible. The CPU 1401 allocates the above-described line buffer 101, buffer 1001, code buffer 401, or the like to the RAM 1402. The CPU 1401 also reads out a Huffman table stored in, for example, the HDD 1407, and stores it in a predetermined area of the RAM 1402 to use it for encoding.

A storage medium drive 1408 drives a storage medium such as an optical disk. A storage medium can store the encoding program or decoding program according to the embodiment. The CPU 1401 can execute the encoding program or decoding program loaded into the RAM 1402 to perform the above-described encoding or decoding of image data.

A user utilizes a keyboard 1404 or a mouse 1405 connected to a USB interface (I/F) 1409 to instruct execution of the encoding or decoding program. When the CPU 1401 receives the instruction, it executes the encoding or decoding program and displays a user interface on a monitor 1406 connected to a video I/F 1412. The CPU 1401 receives selection or designation of data to be encoded or decoded and the output destination of encoded or decoded data.

The user can select or designate data stored in the HDD 1407 or storage medium or data on an external device 1411 or a server apparatus on a network (not shown) as data to be encoded or decoded. The user can also select or designate the HDD 1407, storage medium, external device 1411, server apparatus on the network, or the like as the output destination of encoded or decoded data. Alternatively, the user may select the monitor 1406 as the output destination to display a decoded image.

The CPU 1401 encodes or decodes selected or designated data in accordance with a user's instruction, and outputs the encoded or decoded data to a selected or designated output destination.

Second Embodiment

The image processing of the second embodiment according to the present invention will now be described. Note that the same components as in the first embodiment are denoted by the same reference numerals in the second embodiment, and a detailed description thereof will not be repeated.

The first embodiment has exemplified a case in which the value X of a pixel of interest is compared with the values of eight surrounding pixels, and foreground/background determination is performed based on whether there is any neighborhood pixel having the same (or similar) pixel value as the pixel of interest. However, other methods can be used to perform foreground/background determination. For example, foreground/background determination may be performed by referring to the edge strength of a surrounding pixel or the value of an immediately preceding foreground pixel. In the second embodiment, the edge strength of a surrounding pixel and information of an immediately preceding foreground pixel are added to the conditions of foreground/background determination. With this arrangement, foreground/background determination more suited to the characteristics of an image is possible.

Figure 9:
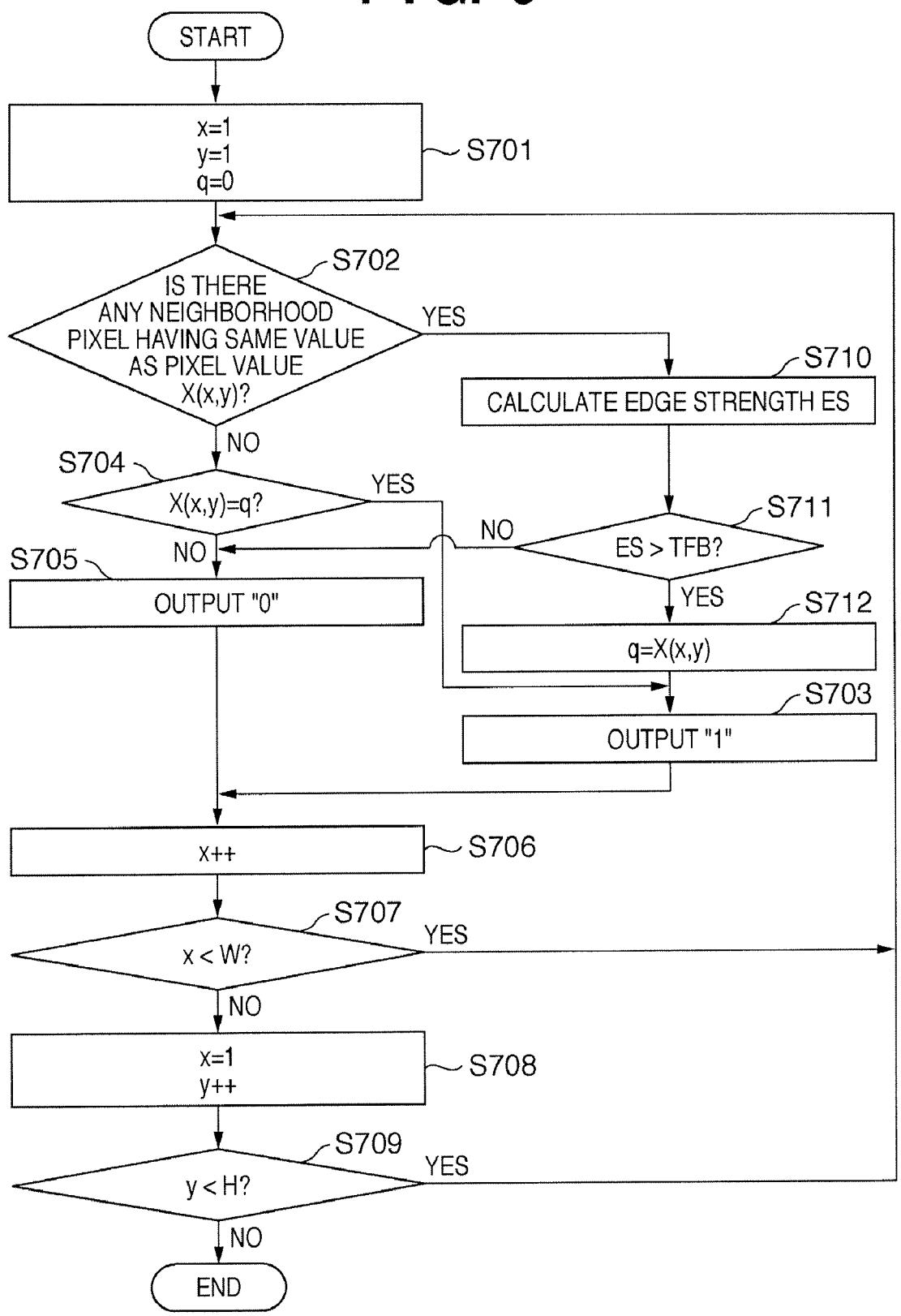
FIG. 9 is a flowchart illustrating the process of a region determination unit of the second embodiment.

FIG. 9 is a flowchart illustrating the process of a region determination unit 102 of the second embodiment.

When encoding is started, the region determination unit 102 initializes a counter x for counting the position of a pixel of interest in the vertical direction and a counter x for counting the position in the horizontal direction to 1, and initializes a determination value q (the value of an immediately preceding foreground pixel) of a foreground pixel to 0 (S701).

The region determination unit 102 compares a value X(x,y) of the pixel of interest with values a to h of eight surrounding pixels (S702). When at least one of the values a to h of the eight surrounding pixels is the same as (or similar to) the value X(x,y) of the pixel of interest, the edge strength of the pixel of interest is calculated (S710). An edge strength ES is calculated by the following method.

The value X(x,y) of the pixel of interest is compared with each of the values a to h of the eight surrounding pixels to calculate a difference value D between the value X(x,y) and the value of each of the eight surrounding pixels having different values from the value X(x,y). Note that a largest absolute difference value among the absolute difference values of R, G, and B components is employed as the difference value D. Therefore, the difference value D ranges from 0 to 255.

For example, assume that the value X(x,y)=(255,128,0) and a value Xa of a given neighborhood pixel, which does not coincide with the value X(x,y), is (254,200,200). In this case, an absolute difference value d for the respective components is (1,72,200). Accordingly, the difference value D=200 between the value X(x,y) and the value Xa. When one neighborhood pixel has a value different from the value X, its difference value is set to the edge strength ES. When a plurality of neighborhood pixels have values different from the value X, the average value of their difference values D is set to the edge strength ES. A give value is designated to set a threshold TFB in this embodiment. Note that when the variable threshold TFB is to be automatically set, the following method or the like is available. That is, the difference between a maximum luminance value and a minimum luminance value within the range of 3×3 pixels including a pixel of interest as a center is calculated, and a value obtained by dividing the absolute value of the difference by 3 is set to the threshold TFB.

The region determination unit 102 compares the edge strength ES with the predetermined threshold TFB (S711) (in this embodiment, the threshold TFB is set to 50). When ES>TFB, the region determination unit 102 determines that the pixel of interest is a foreground pixel, and updates the determination value q of the foreground pixel by q=X(x,y) (S712). The region determination unit 102 outputs determination information "1" (S703), and the process advances to step S706. When ES≦TFB, the region determination unit 102 determines that the pixel of interest is a background pixel and outputs determination information "0". The process then advances to step S706.

On the other hand, when the value X(x,y) of the pixel of interest is the same as (or similar to) none of the values a to h of the eight surrounding pixels, the region determination unit 102 determines whether the value X(x,y) coincides with the determination value q. When X(x,y)=q, the region determination unit 102 determines that the pixel of interest is a foreground pixel and outputs determination information "1" (S703). When X(x,y)≠q, the region determination unit 102 determines that the pixel of interest is a background pixel and outputs determination information "0" (S705).

The region determination unit 102 increments the counter x (S706) and compares the counter x with a pixel count W in the horizontal direction (S707). When x<W, the process returns to step S702 and the next pixel is selected as a pixel of interest. The pixel count W is obtained from the header information of the original image.

When x=W, the region determination unit 102 sets the counter x to 1, increments the counter y (S708), and compares the counter y with a pixel count H in the vertical direction (S709). When y<H, the process returns to step S702 and the next line is selected as a line of interest. The pixel count H is obtained from the header information of the original image.

When y=H, the region determination unit 102 terminates the process.

In this manner, foreground/background determination is performed not only by comparing the value X of a pixel of interest with the values of eight surrounding pixels but also by referring to the edge strength of the pixel of interest. Accordingly, it is possible to increase the accuracy in grouping image data into text regions and photographic regions.

Figure 10:
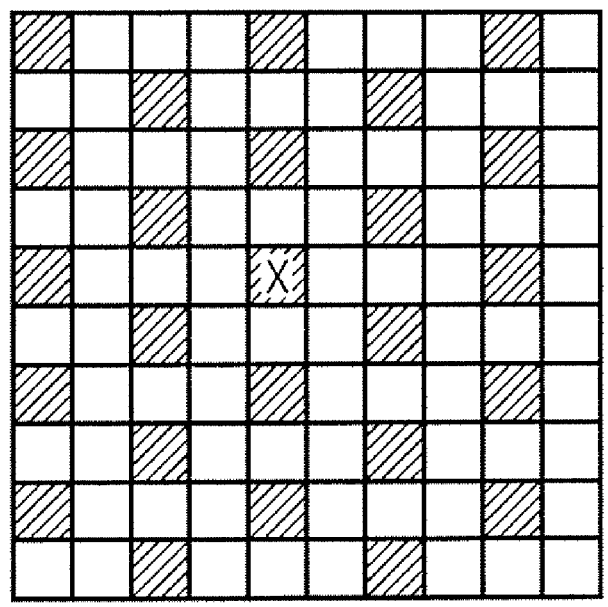
FIG. 10 is a view for explaining a case in which none of eight surrounding pixels have the same value as a pixel of interest.

In addition, the value X of the pixel of interest is compared with the determination value q (the value of the immediately preceding foreground pixel) of a foreground pixel. As the result, even when none of the eight surrounding pixels has the same value as the value X of the pixel of interest, as shown in FIG. 10, it is possible to extract the pixel of interest as a foreground pixel. Therefore, it is possible to apply lossless encoding to the pixels of a text region with a high probability, thereby suppressing quality deterioration of a character image caused by encoding compression.

Third Embodiment

The image processing of the third embodiment according to the present invention will now be described. Note that the same components as in the first and second embodiments are denoted by the same reference numerals in the third embodiment, and a detailed description thereof will not be repeated.

Figure 11:
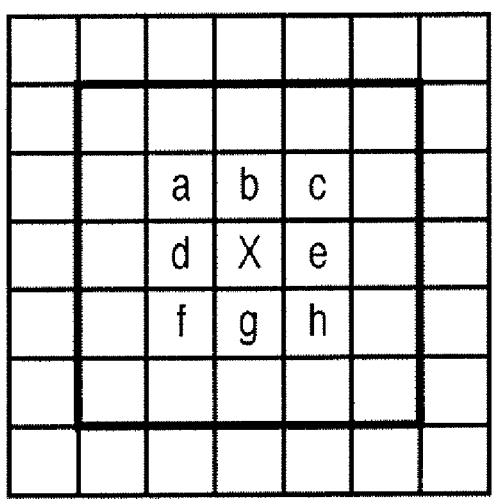
FIG. 11 is a view showing 24 surrounding pixels.

The first embodiment has exemplified a case in which the value X of a pixel of interest is compared with the values of eight surrounding pixels, and foreground/background determination is performed based on whether there is any neighborhood pixel having the same (or similar) pixel value as the pixel of interest. However, other methods can be used to perform foreground/background determination. Foreground/background determination may be performed by extending the region of pixel values to be referred to beyond eight surrounding pixels and, for example, referring to the values of 24 pixels surrounding a pixel of interest indicated by the thick frame in FIG. 11. With this arrangement, foreground/background determination more suited to the characteristics of an image is possible.

First, a region determination unit 102 of the third embodiment performs foreground/background determination by comparing a value X of a pixel of interest with the values of eight surrounding pixels, as in the first embodiment.

When there is no neighborhood pixel having the same (or similar) pixel value as the value X of the pixel of interest in the eight surrounding pixels, the region determination unit 102 compares the values of 16 pixels along the periphery of the eight surrounding pixels with the value X of the pixel of interest. In this case as well, when there is at least one pixel having the same (or similar) pixel value as the value X, determination information "1" is output. Otherwise, determination information "0" is output.

According to the third embodiment, even when none of the eight surrounding pixels has the same (or similar) value as the value X of the pixel of interest as shown in FIG. 10, it is possible to extract the pixel of interest as a foreground pixel. Accordingly, it is possible to apply lossless encoding to the pixels of a text region with a high probability, thereby suppressing quality deterioration of a character image caused by encoding compression.

Fourth Embodiment

The image processing of the fourth embodiment according to the present invention will now be described. Note that the same components as in the first to third embodiments are denoted by the same reference numerals in the fourth embodiment, and a detailed description thereof will not be repeated.

The first embodiment has described a method of collectively processing an entire original image. The fourth embodiment will describe a method of dividing an original image into rectangular blocks and processing each block. When an original image is divided into blocks to perform foreground/background determination, the colors of foreground pixels are likely to be limited, and therefore the efficiency of lossless encoding is expected to increase.

For this purpose, the fourth embodiment will describe a method in which when the colors of foreground pixels are limited (e.g., 32 colors or less), lossless encoding is executed after converting a pixel value into an index value, and when the number of colors is equal to or more than a predetermined number, lossless encoding is executed without changing any pixel values, as described above. Since the process for losslessly encoding pixel values without any change is the same as in the first to third embodiments, only a process of a case in which the number of colors of foreground pixels is within a specific number will be described in detail.

[Encoding Apparatus]

Figure 12:
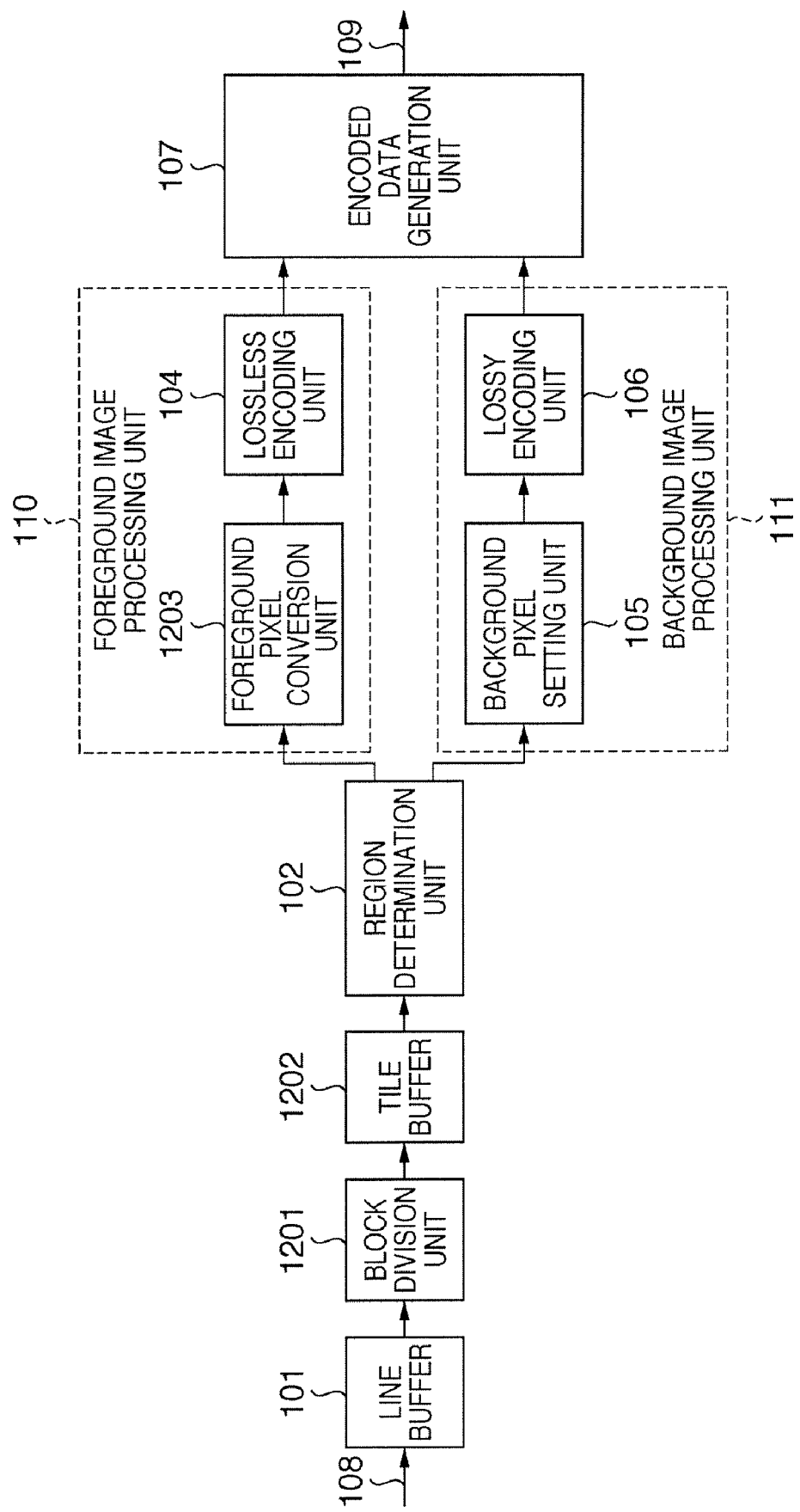
FIG. 12 is a block diagram showing the arrangement of an encoding apparatus of the fourth embodiment.

FIG. 12 is a block diagram showing the arrangement of an encoding apparatus of the fourth embodiment, in which a block division unit 1201, a tile buffer 1202, and a foreground pixel conversion unit 1203 are added to the encoding apparatus shown in FIG. 1 and the transparent color setting unit 103 is removed from it.

The block division unit 1201 divides a stripe image read in from a line buffer 101 into rectangular blocks (tiles) of a horizontal pixel count Tw and a vertical pixel count Th, and outputs them to the tile buffer 1202. The tile buffer 1202 buffers image data for one tile. The tile buffer 1202 requires a storage capacity of at least Tw×Th×3 bytes.

The component value of a pixel at a horizontal direction position x and a vertical direction position y of image data of a tile buffered by the tile buffer 1202 is defined as P(x,y,c). Note that $0 \leq x \leq Tw-1$, $0 \leq y \leq Th-1$, and c is any one of R, G, and B.

A region determination unit 102 inputs the image data of a tile from the tile buffer 1202. The foreground pixel conversion unit 1203 receives the tile data output from the region determination unit 102 and the determination information which indicates a foreground/background determination result, and converts a pixel value into an index value.

[Foreground Pixel Conversion Unit]

Figure 13:
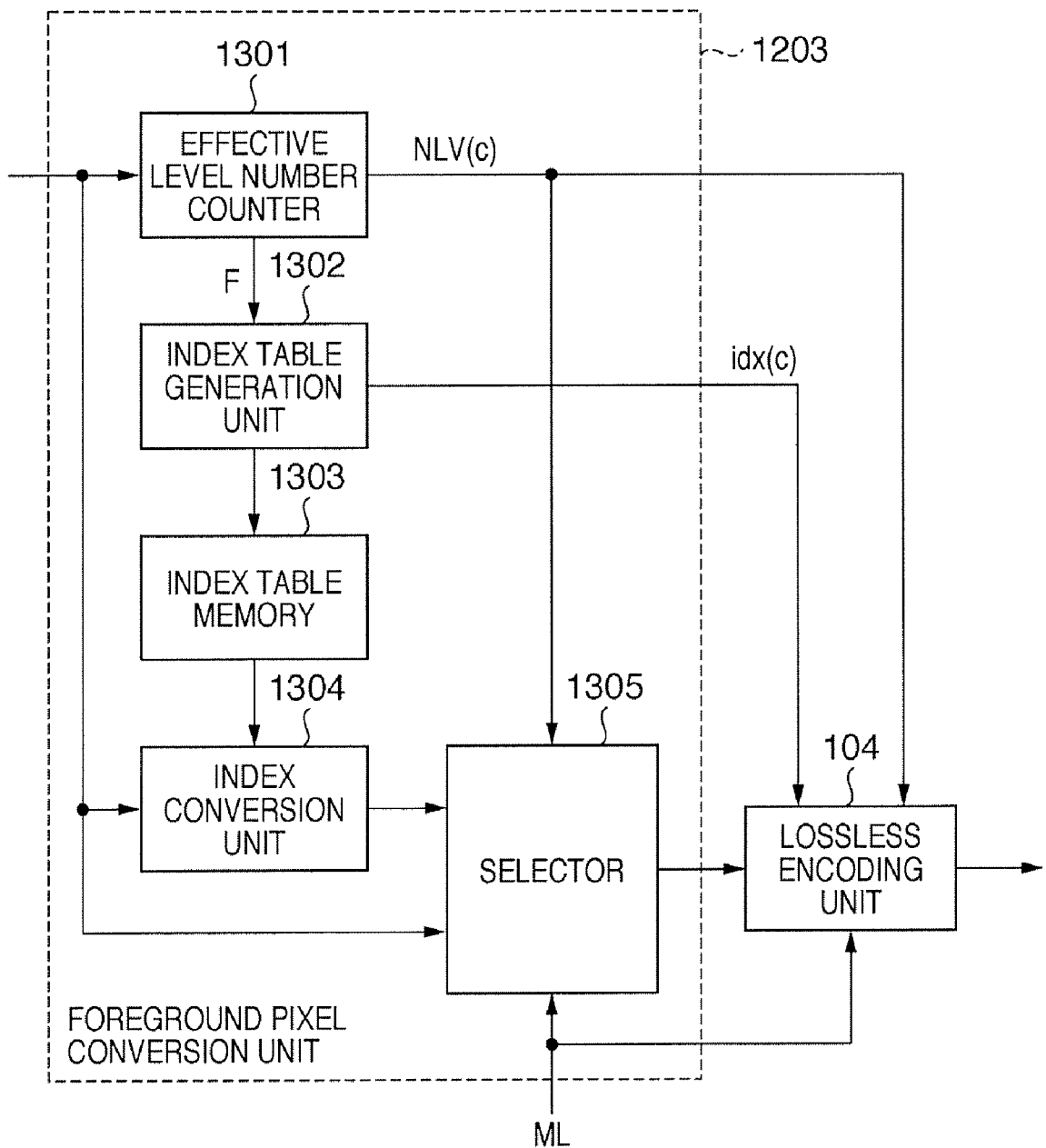
FIG. 13 is a block diagram showing the arrangement of a foreground pixel conversion unit.

FIG. 13 is a block diagram showing the arrangement of the foreground pixel conversion unit 1203.

(Effective Level Number Counter)

An effective level number counter 1301 reads out tile data from the region determination unit 102 and counts the number of signal levels (luminance levels) for each color component of the tile data. In other words, the effective level number counter 1301 counts the number of kinds of signal levels included in the tile data for each color component. The number of signal levels for each color component as the count value of the effective level number counter 1301 is referred to as the effective level count, and the effective level counts of the respective color components are represented by NLV(R), NLV(G), and NLV(B).

Figure 14:
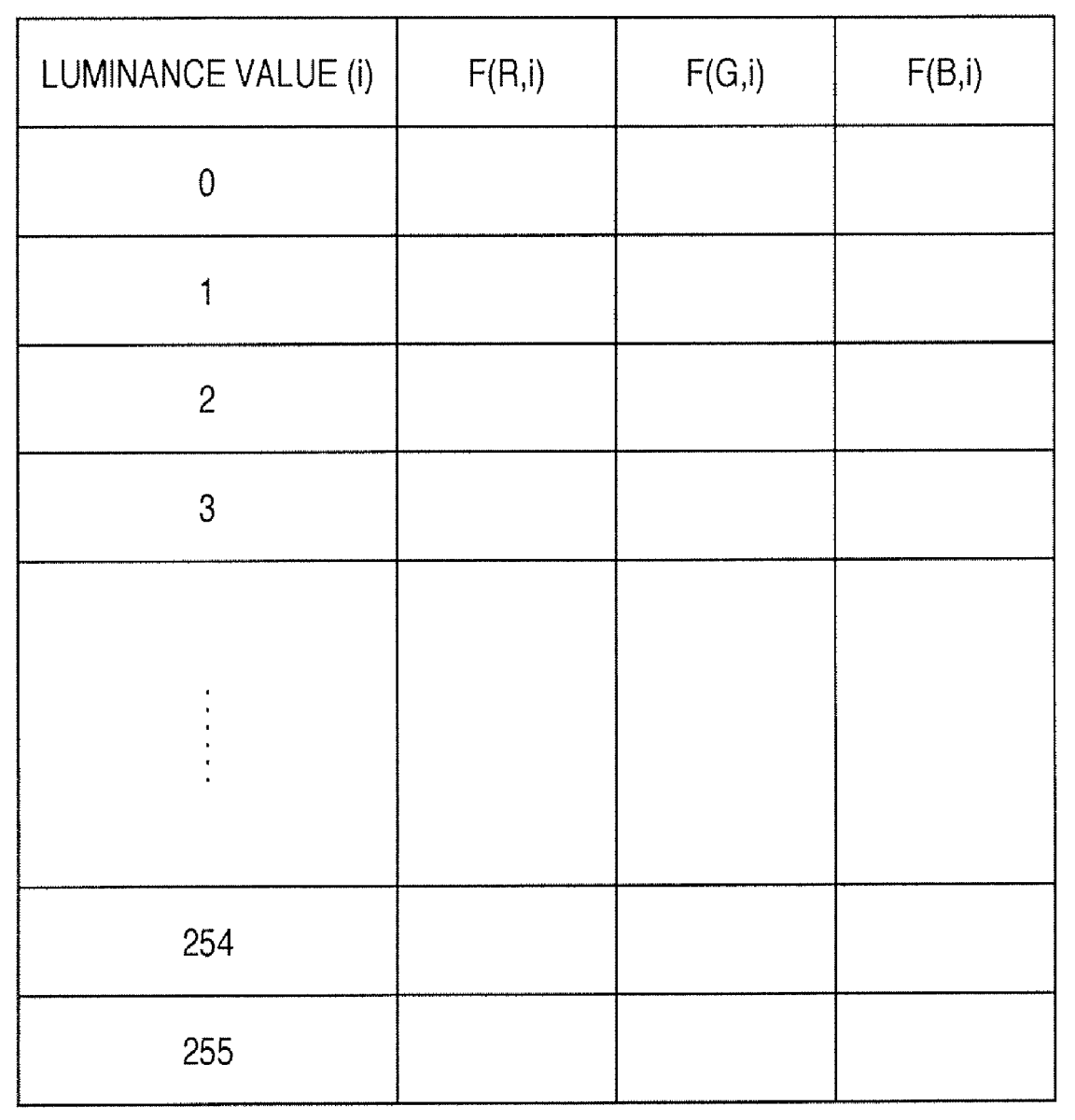

FIG. 14 is a view showing a binary array F(c,i) used by the effective level number counter 1301 to count the effective level count. Numeral c represents a component, which is one of R, G, and B. Numeral i represents a luminance value, which is one of integer values from 0 to 255. F(c,i)="0" means that the luminance value i does not occur in the component c of a tile of interest, and F(c,i)="1" means that the luminance value i occurs in the component c of a tile of interest.

Figure 15:
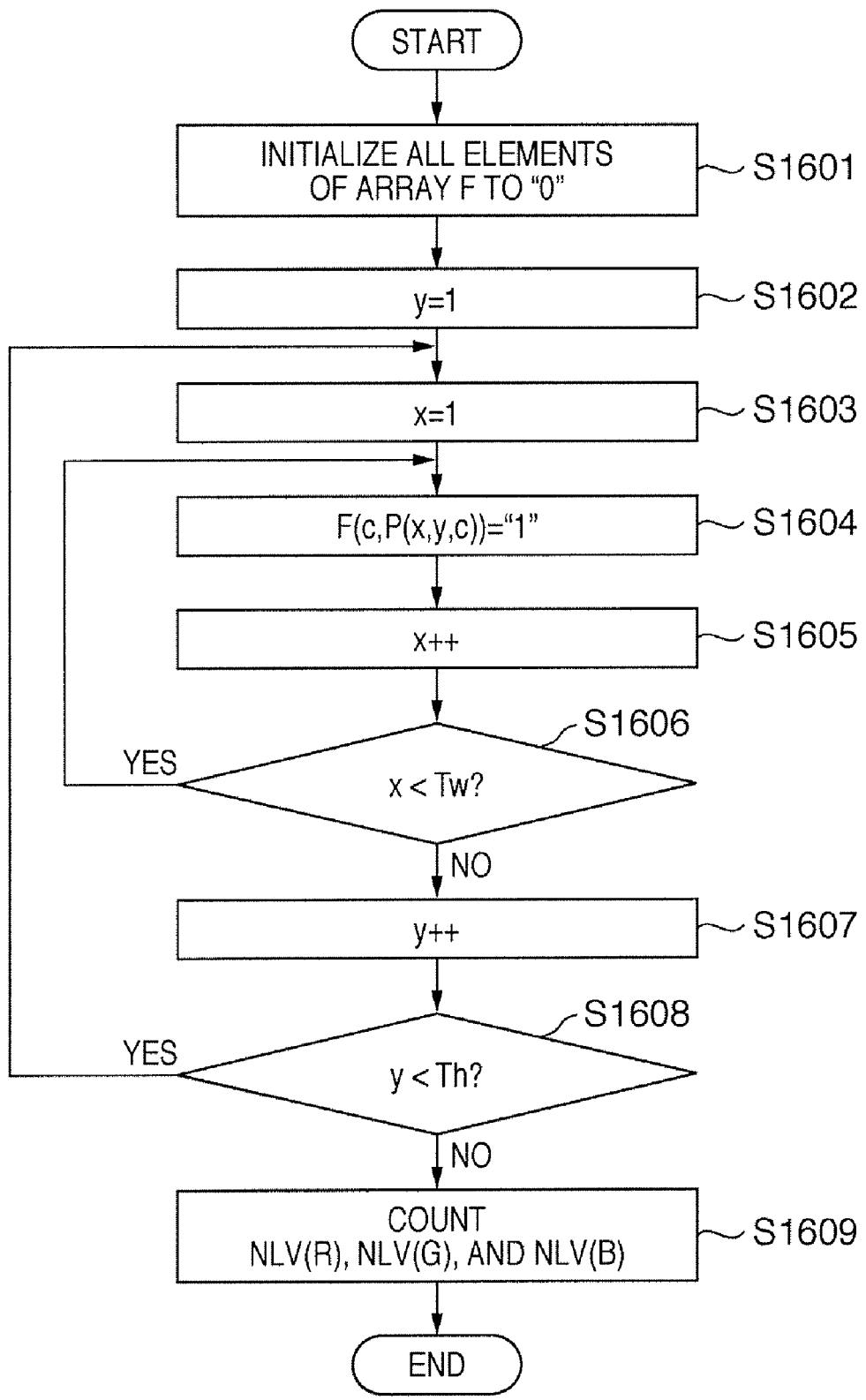
FIG. 15 is a flowchart illustrating the process of the effective level counter.

FIG. 15 is a flowchart illustrating the process of the effective level number counter 1301. The effective level number counter 1301 initializes all the elements of the array F shown in FIG. 14 to "0" (S1601). The effective level number counter 1301 initializes a counter y which indicates a pixel position in the vertical direction in a tile to 1 (S1602), and initializes a counter x which indicates a pixel position in the horizontal direction in a tile to 1 (S1603).

The effective level number counter 1301 obtains tile data P(x,y,c) and increments an element F(c,P(x,y,c)) of the array F (S1604). That is, the effective level number counter 1301 sets elements F(R,P(x,y,R)), F(G,P(x,y,G)), and F(B,P(x,y,B)) of the array F which correspond to P(x,y,R), P(x,y,G), and P(x,y,B), respectively, to "1".

The effective level number counter 1301 increments the counter x (S1605), and compares the counter x with the pixel count Tw in the horizontal direction of the tile (S1606). When x<Tw, the process returns to step S1604, and the effective level number counter 1301 processes the next pixel.

When x=Tw, the effective level number counter 1301 increments the counter y (S1607), and compares the counter y with the pixel count Th in the vertical direction of the tile (S1608). When y<Th, the process returns to step S1603, and the effective level number counter 1301 processes the next line.

When y=Th, the effective level number counter 1301 checks the array F and counts the effective level count NLV(c) of each component (S1609). That is, for the R component, the effective level number counter 1301 counts the number of elements set to "1" among the elements F(R,0) to F(R,255) and sets it as NLV(R). Likewise, NLV(G) and NLV(B) are obtained for the G and B components, respectively.

(Index Table Generation Unit)

Figure 16:
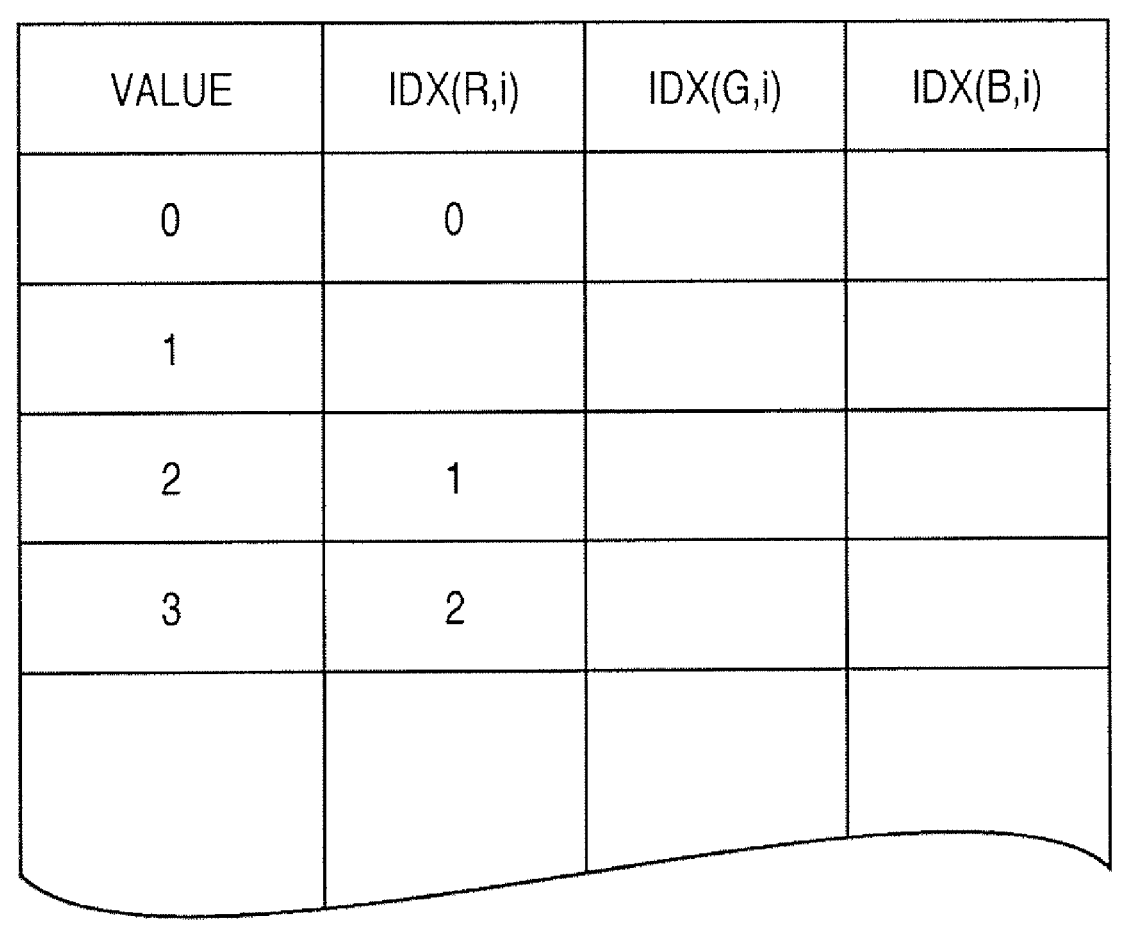

With reference to the array F held by the effective level number counter 1301, an index table generation unit 1302 generates an index conversion table (to be referred to as an index table, hereinafter) IDX as shown in FIG. 16. The index table IDX is looked up when an index conversion unit 1304 converts a luminance value into an index value. Numeral i represents a luminance value, which is one of integer values from 0 to 255. The index table generation unit 1302 stores the generated index table IDX in an index table memory 1303. In addition, the index table generation unit 1302 outputs conversion table information to be added to encoded data to a lossless encoding unit 104.

Figure 17:
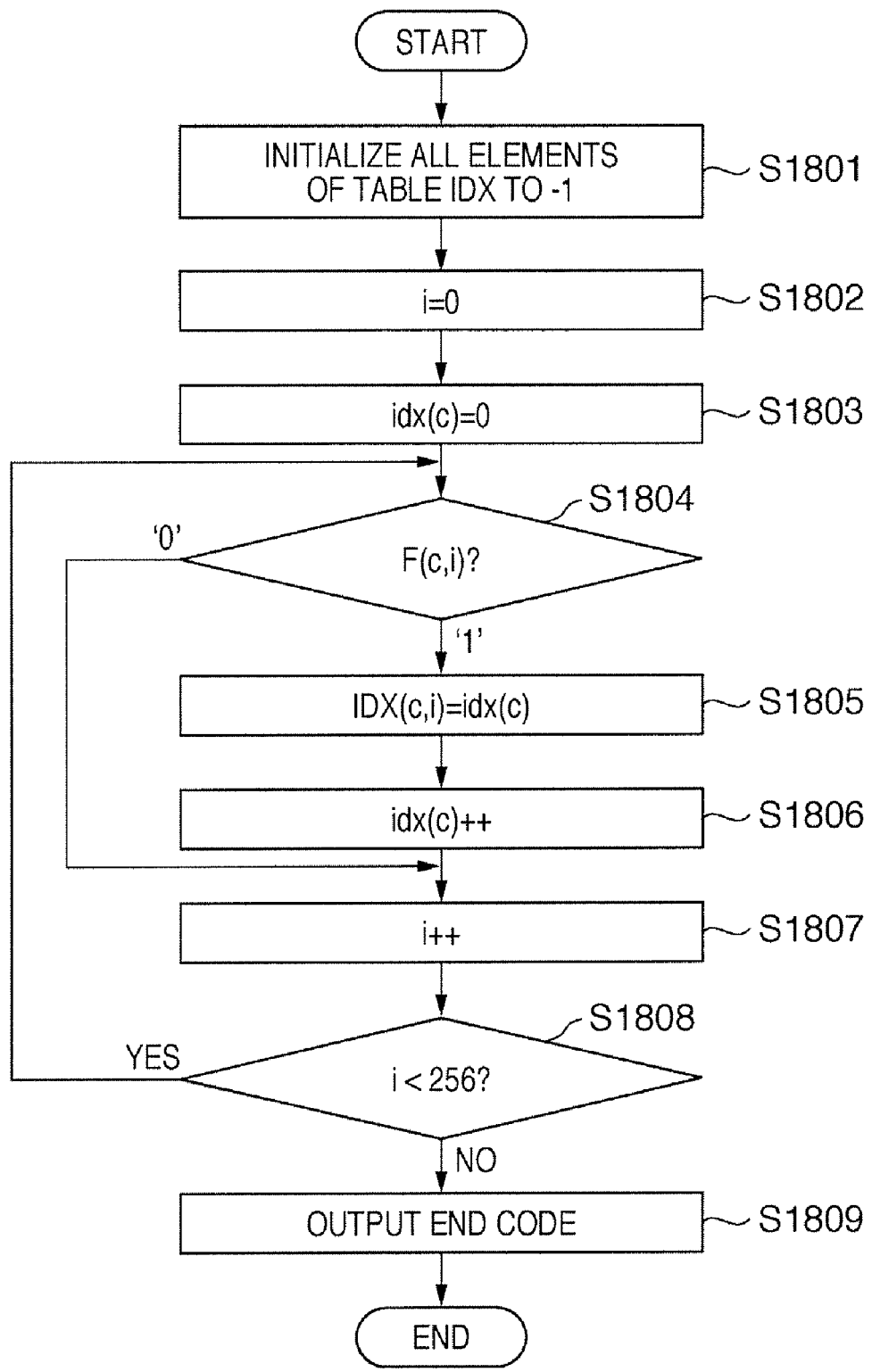
FIG. 17 is a flowchart illustrating the process of an index table generation unit.

FIG. 17 is a flowchart illustrating the process of the index table generation unit 1302. Note that the index table generation unit 1302 generates an index table for each color component, but the process is the same for each color component. Accordingly, the process will be described for a component c herein.

The index table generation unit 1302 initializes all the elements of the index table IDX held by the index table memory 1303 to −1 (S1801). The index table generation unit 1302 initializes a counter which represents a luminance value to 0 (S1802), and initializes a variable idx(c) which represents an index value to 0 (S1803).

With reference to the array F held by the effective level number counter 1301, the index table generation unit 1302 determines F(c,i) corresponding to the luminance value of interest i (S1804). When F(c,i)="0", the process advances to step S1807. When F(c,i)="1", the index table generation unit 1302 sets idx(c) in IDX(c,i) and outputs idx(c) to the lossless encoding unit 104 (S1805).

The index table generation unit 1302 increments idx(c) (S1806), increments the counter i (S1807), and determines whether i<256 (S1808). When i<256, the process returns to step S1804, and the index table generation unit 1302 processes the next luminance value.

When i=256, the index table generation unit 1302 outputs −1 as an end code representing the end of additional information of one color component to the lossless encoding unit 104 (S1809).

The index table generation unit 1302 executes the above-described process for each of the R, G, and B components to generate the index table IDX in the index table memory 1303, and outputs conversion table information to the lossless encoding unit 104.

[Process after Index Conversion Unit]

After counting of the effective level counts of the tile of interest and generation of the index table IDX are completed, the index conversion unit 1304, a selector 1305, the foreground pixel conversion unit 1203, and the lossless encoding unit 104 start encoding of the tile data stored in the tile buffer 1202.

The encoding apparatus reads out and encodes tile data in the order of color components and that of raster scan. That is, the encoding apparatus encodes the R, G, and B components of a tile in the order mentioned. Since the encoding process is the same for each component, the encoding process will be described for a color component c herein.

The index conversion unit 1304 looks up the index table IDX to replace the luminance value P(x,y,c) of a foreground pixel read out from the tile buffer 1202 in the order of components and that of raster scan by an index value IDX(c,P(x,y,c)). The index conversion unit 1304 selects an index value which is not defined in the index table IDX, that is, an index value IDX(c,j) whose element is −1 to set it as a transparent color t, and replaces the luminance value P(x,y,c) of a background pixel by the transparent color t.

The selector 1305 inputs the luminance value P(x,y,c) read our from the tile buffer 1202 in the order of components and that of raster scan. The selector 1305 also inputs the index value IDX(c,P(x,y,c)) or transparent color t=IDX(c,j) output from the index conversion unit 1304. The selector 1305 compares a predetermined threshold ML with the effective level count NLV(c) held by the effective level number counter 1301. When NLV(c)<ML, the selector 1305 selectively outputs the output value from the index conversion unit 1304. When NLV(c)≧ML, the selector 1305 selectively outputs the luminance value P(x,y,c) or transparent color t read out from the tile buffer 1202.

The lossless encoding unit 104 losslessly encodes image data input from the selector 1305, and outputs encoded data for each tile with a header including information (to be described later) which indicates the determination result of the effective level count NLV(c) and conversion table information.

FIGS. 18A and 18B are views showing examples of the structure of encoded data for each tile.

One-byte information indicating the determination result of the effective level count NLV(c) is added in the leading portion of encoded data for each tile. As shown in FIG. 18A, the most significant bit (MSB) is bit 7, and the least significant bit (LSB) is bit 0. In this case, when bit 2 is "1", it represents NLV(R)<ML. When bit 1 is "1", it represents NLV(G)<ML. When bit 0 is "1", it represents NLV(B)<ML. Note that "0" is set in each of bits 7 to 3.

When any one of NLV(R), NLV(G), and NLV(B) is smaller than ML, that is, when the start byte >0, as shown in FIG. 18A, conversion table information is added after the start byte of the encoded data. When all of NLV(R), NLV(G), and NLV(B) are equal to or more than ML, that is, when the start byte=0, as shown in FIG. 18B, no conversion table information is added. Conversion table information is added to encoded data only for color components which satisfies NLV(c)<ML.

For a given tile, assume that the conversion table information idx(c) is described as below. Note that −1 is a delimiter of the conversion table information of each color component.

0, 1, 2, 3, 4, . . . , 254, 255, −1, 0, 128, 255, −1, 0, 64, 128, 192, 255.

When NLV(R)=255, NLV(G)=3, NLV(B)=5, and ML=32, the start byte of the encoded data is "00000011"=3. In this case, the pieces of conversion table information of the color components G and B are extracted from the conversion table information using the delimiter −1 and added to the encoded data. Therefore, in the above-described example, the conversion table information added to the encoded data is described as:

0, 128, 255, 0, 0, 64, 128, 192, 255.

When conversion table information is added to encoded data, the delimiter −1 is replaced by 0 and 0 at the end of the conversion table information is erased. The decoding apparatus sequentially analyzes conversion table information from the left to the right, and determines a value that is smaller than or equal to the preceding value as a delimiter.

In this manner, when encoding is executed for each tile and necessary conversion table information is included in the encoded data of each tile, the decoding apparatus can decode image data for each tile.

Note that, in order to prevent a predetermined value from occurring in encoded data, a specific marker is set and arranged in the start or end portion of the encoded data of each tile, or the encoded data length of each tile is separately managed. With this arrangement, it becomes possible to randomly access and decode each tile.

As has been described above, lossless encoding for each tile becomes possible. In addition, when the effective level count of the luminance value of a tile is smaller than the threshold ML, the luminance value of the corresponding color component of the foreground image is replaced by an index value. Furthermore, the transparent color t is set for each color component to execute lossless encoding.

Accordingly, when an original image is divided into blocks to perform foreground/background determination, the colors of foreground pixels are likely to be limited and replaced by index values, and thus the efficiency of lossless encoding improves. That is, in addition to the effect in the first embodiment or the like, an original image in which a text region and photographic region mix can be efficiently compressed and encoded.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-150778, filed Jun. 6, 2007, which is hereby incorporated by reference herein in its entirety.

What is claimed is:

1. An image processing apparatus comprising:
an input section, configured to input image data including foreground pixels and background pixels;
a first generator, configured to generate first image data by replacing a pixel value of the background pixel with a transparent value based on a histogram of pixel values that occur as the foreground pixels, wherein the transparent value does not occur as the foreground pixel, and is a value adjacent to a minimum pixel value or a maximum pixel value that occurs in the foreground pixel;
a first encoder, configured to encode the first image data;
a second generator, configured to generate second image data by replacing a pixel value of the foreground pixel with a pixel value obtained from at least one of the background pixels close to the foreground pixel; and
a second encoder, configured to encode the second image data.

2. The apparatus according to claim 1, wherein the first encoder executes lossless encoding, and the second encoder executes lossy encoding.

3. The apparatus according to claim 1, further comprising a separator configured to separate pixels of interest of the input image data into the foreground pixels and the background pixels based on a value of the pixel of interest and values of a plurality of pixels surrounding the pixel of interest,
wherein the separator compares the value of the pixel of interest with the values of the plurality of surrounding pixels, separates the pixel of interest as the foreground pixel in a case where there is a surrounding pixel having a same value as the pixel of interest, and separates the pixel of interest as the background pixel in another case where there is no surrounding pixel having a same value as the pixel of interest.

4. The apparatus according to claim 1, further comprising a separator configured to separate pixels of interest of the input image data into the foreground pixels and the background pixels based on a value of the pixel of interest and values of a plurality of pixels surrounding the pixel of interest,
wherein the separator calculates differences between the value of the pixel of interest and the values of the plurality of surrounding pixels, separates the pixel of interest as the foreground pixel in a case where there is a surrounding pixel having the difference smaller than a first threshold, and separates the pixel of interest as the background pixel in another case where there is no surrounding pixel having the difference smaller than the first threshold.

5. The apparatus according to claim 1, further comprising a separator configured to separate pixels of interest of the input image data into the foreground pixels and the background pixels based on a value of the pixel of interest and values of a plurality of pixels surrounding the pixel of interest,
wherein the separator comprises:
a comparator, configured to compare the value of the pixel of interest with the values of the plurality of surrounding pixels;
a first classification section, configured to classify, if there is a surrounding pixel having a same value as the pixel of interest, by calculating an edge strength between the pixel of interest and the plurality of surrounding pixels, the pixel of interest as the foreground pixel in a case where the edge strength exceeds a second threshold, and classify the pixel of interest as the background pixel in another case where the edge strength does not exceed the second threshold;
an updater, configured to update a determination value of a foreground pixel based on the value of the pixel of interest classified as the foreground pixel by the first classification section; and
a second classification section, configured to classify, if there is no surrounding pixel having a same value as the pixel of interest, the pixel of interest as the foreground pixel in a case where the value of the pixel of interest coincides with the determination value, and classify the pixel of interest as a background pixel in another case where the value of the pixel of interest does not coincide with the determination value.

6. The apparatus according to claim 1, wherein the first generator comprises:
a counter, configured to count a number of effective signal levels included in the image data for each color component;
a third generator, configured to generate an index table based on the number of signal levels for the each color components; and
a converter, configured to convert the value of the foreground pixel into an index value based on the index table in a case where the number of signal levels is smaller than a third threshold for the each color components.

7. An image processing apparatus comprising:
an input section, configured to input image data including foreground pixels and background pixels;
a first generator, configured to generate first image data by replacing a pixel value of the background pixel with a transparent value based on a histogram of pixel values that occur as the foreground pixels, wherein the transparent value does not occur as the foreground pixel, and is a value closest to a median of pixel values that occur in the foreground pixels;
a first encoder, configured to encode the first image data;
a second generator, configured to generate second image data by replacing a pixel value of the foreground pixel with a pixel value obtained from at least one of the background pixels close to the foreground pixel; and
a second encoder, configured to encode the second image data.

8. The apparatus according to claim 7, wherein the first encoder executes lossless encoding, and the second encoder executes lossy encoding.

9. The apparatus according to claim 7, further comprising a separator configured to separate pixels of interest of the input image data into the foreground pixels and the background pixels based on a value of the pixel of interest and values of a plurality of pixels surrounding the pixel of interest,
wherein the separator compares the value of the pixel of interest with the values of the plurality of surrounding pixels, separates the pixel of interest as the foreground pixel in a case where there is a surrounding pixel having a same value as the pixel of interest, and separates the pixel of interest as the background pixel in another case where there is no surrounding pixel having a same value as the pixel of interest.

10. The apparatus according to claim 7, further comprising a separator configured to separate pixels of interest of the input image data into the foreground pixels and the background pixels based on a value of the pixel of interest and values of a plurality of pixels surrounding the pixel of interest,
wherein the separator calculates differences between the value of the pixel of interest and the values of the plurality of surrounding pixels, separates the pixel of interest as the foreground pixel in a case where there is a surrounding pixel having the difference smaller than a first threshold, and separates the pixel of interest as the background pixel in another case where there is no surrounding pixel having the difference smaller than the first threshold.

11. The apparatus according to claim 7, further comprising a separator configured to separate pixels of interest of the input image data into the foreground pixels and the background pixels based on a value of the pixel of interest and values of a plurality of pixels surrounding the pixel of interest,
wherein the separator comprises:
a comparator, configured to compare the value of the pixel of interest with the values of the plurality of surrounding pixels;
a first classification section, configured to classify, if there is a surrounding pixel having a same value as the pixel of interest, by calculating an edge strength between the pixel of interest and the plurality of surrounding pixels, the pixel of interest as the foreground pixel in a case where the edge strength exceeds a second threshold, and classify the pixel of interest as the background pixel in another case where the edge strength does not exceed the second threshold;
an updater, configured to update a determination value of a foreground pixel based on the value of the pixel of interest classified as the foreground pixel by the first classification section; and
a second classification section, configured to classify, if there is no surrounding pixel having a same value as the pixel of interest, the pixel of interest as the foreground pixel in a case where the value of the pixel of interest coincides with the determination value, and classify the pixel of interest as a background pixel in another case where the value of the pixel of interest does not coincide with the determination value.

12. The apparatus according to claim 7, wherein the first generator comprises:
a counter, configured to count a number of effective signal levels included in the image data for each color component;
a third generator, configured to generate an index table based on the number of signal levels for the each color components; and
a converter, configured to convert the value of the foreground pixel into an index value based on the index table in a case where the number of signal levels is smaller than a third threshold for the each color components.

13. An image processing apparatus comprising:
an input section, configured to input data including foreground pixels and background pixels;
a first generator, configured to generate first image data by replacing a pixel value of the background pixel with a transparent value based on a histogram of pixel values that occur as the foreground pixels in the image data, wherein the transparent value does not occur as the foreground pixel, and is a value closest to a luminance value having a highest frequency of occurrence among pixel values that occur in the foreground pixels, a first encoder, configured to encode the first image data;

a second generator, configured to generate second image data by replacing a pixel value of the foreground pixel with a pixel value obtained from at least one of the background pixels close to the foreground pixel; and a second encoder, configured to encode the second image data.

14. The apparatus according to claim 13, wherein the first encoder executes lossless encoding, and the second encoder executes lossy encoding.

15. The apparatus according to claim 13, further comprising a separator configured to separate pixels of interest of the input image data into the foreground pixels and the background pixels based on a value of the pixel of interest and values of a plurality of pixels surrounding the pixel of interest, wherein the separator compares the value of the pixel of interest with the values of the plurality of surrounding pixels, separates the pixel of interest as the foreground pixel in a case where there is a surrounding pixel having a same value as the pixel of interest, and separates the pixel of interest as the background pixel in another case where there is no surrounding pixel having a same value as the pixel of interest.

16. The apparatus according to claim 13, further comprising a separator configured to separate pixels of interest of the input image data into the foreground pixels and the background pixels based on a value of the pixel of interest and values of a plurality of pixels surrounding the pixel of interest, wherein the separator calculates differences between the value of the pixel of interest and the values of the plurality of surrounding pixels, separates the pixel of interest as the foreground pixel in a case where there is a surrounding pixel having the difference smaller than a first threshold, and separates the pixel of interest as the background pixel in another case where there is no surrounding pixel having the difference smaller than the first threshold.

17. The apparatus according to claim 13, further comprising a separator configured to separate pixels of interest of the input image data into the foreground pixels and the background pixels based on a value of the pixel of interest and values of a plurality of pixels surrounding the pixel of interest, wherein the separator comprises:

a comparator, configured to compare the value of the pixel of interest with the values of the plurality of surrounding pixels;

a first classification section, configured to classify, if there is a surrounding pixel having a same value as the pixel of interest, by calculating an edge strength between the pixel of interest and the plurality of surrounding pixels, the pixel of interest as the foreground pixel in a case where the edge strength exceeds a second threshold, and classify the pixel of interest as the background pixel in another case where the edge strength does not exceed the second threshold;

an updater, configured to update a determination value of a foreground pixel based on the value of the pixel of interest classified as the foreground pixel by the first classification section; and a second classification section, configured to classify, if there is no surrounding pixel having a same value as the pixel of interest, the pixel of interest as the foreground pixel in a case where the value of the pixel of interest coincides with the determination value, and classify the pixel of interest as a background pixel in another case where the value of the pixel of interest does not coincide with the determination value.

18. The apparatus according to claim 13, wherein the first generator comprises:

a counter, configured to count a number of effective signal levels included in the image data for each color component;

a third generator, configured to generate an index table based on the number of signal levels for the each color components; and a converter, configured to convert the value of the foreground pixel into an index value based on the index table in a case where the number of signal levels is smaller than a third threshold for the each color components.

19. An image processing method comprising the steps of:

inputting image data including foreground pixels and background pixels;

generating first image data by replacing a pixel value of the background pixel with a transparent value based on a histogram of pixel values that occur as the foreground pixels, wherein the transparent value does not occur as the foreground pixel, and is a value adjacent to a minimum pixel value or a maximum pixel value that occurs in the foreground pixel;

encoding the first image data;

generating second image data by replacing a pixel value of the foreground pixel with a pixel value obtained from at least one of the background pixels close to the foreground pixel; and encoding the second image data.

20. An image processing method comprising the steps of:

inputting image data including foreground pixels and background pixels;

generating first image data by replacing a pixel value of the background pixel with a transparent value based on a histogram of pixel values that occur as the foreground pixels, wherein the transparent value does not occur as the foreground pixel, and is a value closest to a median of pixel values that occur in the foreground pixels;

encoding the first image data;

generating second image data by replacing a pixel value of the foreground pixel with a pixel value obtained from at least one of the background pixels close to the foreground pixel; and encoding the second image data.

21. An image processing method comprising the steps of:

inputting image data including foreground pixels and background pixels;

generating first image data by replacing a pixel value of the background pixel with a transparent value based on a histogram of pixel values that occur as the foreground pixels, wherein the transparent value does not occur as the foreground pixel, and is a value closest to a luminance value having a highest frequency of occurrence among pixel values that occur in the foreground pixels;

encoding the first image data;

generating second image data by replacing a pixel value of the foreground pixel with a pixel value obtained from at least one of the background pixels close to the foreground pixel; and encoding the second image data.

* * * * *